US010731531B2

(12) United States Patent
Takada et al.

(10) Patent No.: US 10,731,531 B2
(45) Date of Patent: Aug. 4, 2020

(54) INTERNAL COMBUSTION ENGINE PROVIDED WITH ELECTROCHEMICAL REACTOR AND VEHICLE MOUNTING INTERNAL COMBUSTION ENGINE

(71) Applicant: TOYOTA JIDOSHA KABUSHIKI KAISHA, Toyota-shi, Aichi-ken (JP)

(72) Inventors: Keishi Takada, Ashigarakami-gun (JP); Tetsuya Sakuma, Gotemba (JP); Hiromasa Nishioka, Susono (JP); Hiroshi Otsuki, Gotemba (JP); Hirohito Hirata, Sunto-gun (JP); Yoshiyuki Sakamoto, Nagakute (JP); Tsuyoshi Hamaguchi, Nagakute (JP); Chika Kato, Nagakute (JP); Yuji Sakakibara, Nagakute (JP); Takashi Kuzuya, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/399,297

(22) Filed: Apr. 30, 2019

(65) Prior Publication Data
US 2019/0345860 A1 Nov. 14, 2019

(30) Foreign Application Priority Data

May 10, 2018 (JP) .................................. 2018-091735

(51) Int. Cl.
*F01N 3/08* (2006.01)
*F01N 9/00* (2006.01)
(Continued)

(52) U.S. Cl.
CPC ......... *F01N 3/0892* (2013.01); *B01D 53/326* (2013.01); *F02D 45/00* (2013.01); *F01N 9/002* (2013.01); *F01N 2240/34* (2013.01)

(58) Field of Classification Search
CPC ........ F01N 3/0892; F01N 3/208; F01N 9/002; F01N 9/008; F01N 11/00; F01N 2550/02;
(Continued)

(56) References Cited

U.S. PATENT DOCUMENTS

| 6,698,188 B2 * | 3/2004 | Irisawa ................. F01N 3/0807 60/276 |
| 2009/0145108 A1 | 6/2009 | Koide et al. | |
| 2010/0326054 A1 * | 12/2010 | Kato ................... F01N 13/0097 60/280 |

FOREIGN PATENT DOCUMENTS

| JP | 2008-110277 A | 5/2008 |
| JP | 2009-138522 A | 6/2009 |

* cited by examiner

*Primary Examiner* — Mark A Laurenzi
*Assistant Examiner* — Dapinder Singh
(74) *Attorney, Agent, or Firm* — Oliff PLC

(57) ABSTRACT

An internal combustion engine 1 is provided, in an exhaust passage thereof with an electrochemical reactor including: an ion conductive solid electrolyte layer; an anode layer arranged on a surface of the solid electrolyte layer; and a cathode layer arranged on a surface of the solid electrolyte layer and able to hold $NO_X$. The engine includes a current control device for controlling the current supplied to the electrochemical reactor so as to flow from the anode layer through the solid electrolyte layer to the cathode layer. The current control device is configured so as to supply current to the electrochemical reactor at least temporarily while that internal combustion engine is stopped.

10 Claims, 18 Drawing Sheets

(51) Int. Cl.
*F02D 45/00* (2006.01)
*B01D 53/32* (2006.01)

(58) Field of Classification Search
CPC ......... F01N 2560/021; F01N 2560/026; F01N 2560/06; F01N 2610/02; F01N 2900/1402; F01N 2900/1404; F01N 2900/1616; F01N 2900/1621; F01N 2240/34; B01D 53/326; F02D 45/00; Y02T 10/24; Y02T 10/47
USPC .......................... 60/274, 277, 286, 297, 311
See application file for complete search history.

INTERNAL COMBUSTION ENGINE PROVIDED WITH ELECTROCHEMICAL REACTOR AND VEHICLE MOUNTING INTERNAL COMBUSTION ENGINE

FIELD

The present invention relates to an internal combustion engine provided with an electrochemical reactor and a vehicle mounting the internal combustion engine.

BACKGROUND

Known in the past has been an internal combustion engine provided in an exhaust passage with an electrochemical reactor provided with a ion-conductive solid electrolyte layer, an anode layer arranged on a surface of the solid electrolyte layer, and a cathode layer arranged on a surface of the solid electrolyte layer (for example, JP 2009-138522 A and JP 2008-110277 A). In such an electrochemical reactor, if electric current is provided so as to flow from the anode layer through the solid electrolyte to the cathode layer, the $NO_X$ is reduced to $N_2$ and purified on the cathode layer.

In JP 2009-138522 A, the larger the flow rate of the exhaust gas, the larger the current supplied to the electrochemical reactor is made. If increasing the current supplied to the electrochemical reactor, the amount of $NO_X$ able to be removed per unit time becomes greater, and therefore by changing the magnitude of the supplied current in accordance with the flow rate of the exhaust gas, it is considered possible to suitably remove $NO_X$ regardless of the flow rate of the exhaust gas.

Further, in JP 2008-110277 A, the cathode layer is configured to enable it to hold $NO_X$. Due to this, even if oxygen, which obstructs the chemical reaction of $NO_X$, is excessively present in the cathode layer, $NO_X$ is selectively held at the cathode layer and accordingly it is considered possible to efficiently remove $NO_X$.

SUMMARY

Technical Problem

In this regard, if the cathode layer is configured to be able to hold $NO_X$, the greater the amount of $NO_X$ held at the cathode layer, the lower the $NO_X$ holding ability of the cathode layer to further hold the $NO_X$ in the exhaust gas.

Further, when the internal combustion engine is stopped, sometimes $NO_X$ remains held at the cathode layer. However, for example, as shown in JP 2009-138522 A, if the current supplied to the electrochemical reactor is controlled in accordance with the flow rate of the exhaust gas, current is not supplied to the electrochemical reactor while the internal combustion engine is stopped. Therefore, the $NO_X$ held at the cathode layer remains as it is while the engine is stopped. In this case, when the internal combustion engine is started next time, the $NO_X$ holding ability at the cathode layer is low and, as a result, the ability to remove $NO_X$ in the exhaust gas may be low at the time of start of the internal combustion engine.

The present invention was made in consideration of the above problem and has as its object to raise the performance of an electrochemical reactor in removing $NO_X$ when starting up an internal combustion engine.

Solution to Problem

The present invention was made so as to solve the above problem and has as its gist the following.

(1) An internal combustion engine, inside of an exhaust passage of which is placed an electrochemical reactor comprising: an ion conductive solid electrolyte layer; an anode layer arranged on a surface of the solid electrolyte layer; and a cathode layer arranged on a surface of the solid electrolyte layer and able to hold $NO_X$, wherein the engine comprises a current control device controlling the current supplied to the electrochemical reactor so as to flow from the anode layer through the solid electrolyte layer to the cathode layer, and the current control device is configured so as to supply current to the electrochemical reactor at least temporarily while that internal combustion engine is stopped.

(2) The internal combustion engine according to above (1), wherein the current control device is configured to supply current to the electrochemical reactor at least temporarily while that internal combustion engine is operating.

(3) The internal combustion engine according to above (2), wherein the solid electrolyte layer of the electrochemical reactor have proton conductivity, and the current control device is configured to control the current supplied to the electrochemical reactor so that the current supplied to the electrochemical reactor while the internal combustion engine is stopped is smaller than the current supplied to the electrochemical reactor while the internal combustion engine is operating.

(4) The internal combustion engine according to any one of above (1) to (3), wherein the engine further comprises an exhaust purification catalyst provided in the exhaust passage, the exhaust purification catalyst is configured to purify $NO_X$ in exhaust gas when its temperature is equal to or greater than an activation temperature, and the current control device is configured to not supply current to the electrochemical reactor while the internal combustion engine is stopped, when the temperature of the exhaust purification catalyst is equal to or greater than the activation temperature.

(5) The internal combustion engine according to any one of above (1) to (4), wherein the engine further comprises an outside air introduction mechanism introducing outside air into the exhaust passage at the upstream side of the electrochemical reactor in the direction of exhaust flow, and the outside air introduction mechanism is configured to introduce outside air into the exhaust passage at least temporarily while the internal combustion engine is stopped.

(6) The internal combustion engine according to any one of above (1) to (5), wherein the current control device: is configured to estimate the amount of $NO_X$ held at the cathode layer of the electrochemical reactor; and is configured to not start the supply of current to the electrochemical reactor while the internal combustion engine is stopped, when the estimated amount of $NO_X$ is less than a predetermined reference amount.

(7) A vehicle mounting the internal combustion engine according to any one of above (1) to (6) and a motor, wherein the vehicle comprises a battery supplying electric power to the motor and connected to the electrochemical reactor, and current to the electrochemical reactor is supplied from the battery.

(8) The vehicle according to above (7), wherein the current control device is configured to not supply current to the electrochemical reactor when the state of charge of the battery is equal to or less than a predetermined reference value.

(9) The vehicle according to above (7) or (8), wherein the vehicle further comprises a vehicle side connector connected to the battery, the vehicle side connector is configured to be able to charge the battery by being connected to an outside power source, and the current control device is configured so as to supply current to the electrochemical reactor while the internal combustion engine is stopped, when the vehicle side connector is connected to the outside power source and the battery is being charged.

(10) The vehicle according to any one of above (7) to (9) wherein the vehicle further comprises a generator able to generate power while the vehicle is decelerating and connected to the battery, and the current control device is configured so as to supply current to the electrochemical reactor when power is being generated by the generator along with deceleration of the vehicle while the internal combustion engine is stopped.

Advantageous Effects of Invention

According to the present invention, it is possible to raise the performance of an electrochemical reactor in removing $NO_X$ when starting up an internal combustion engine.

DESCRIPTION OF EMBODIMENT

Figure 1:
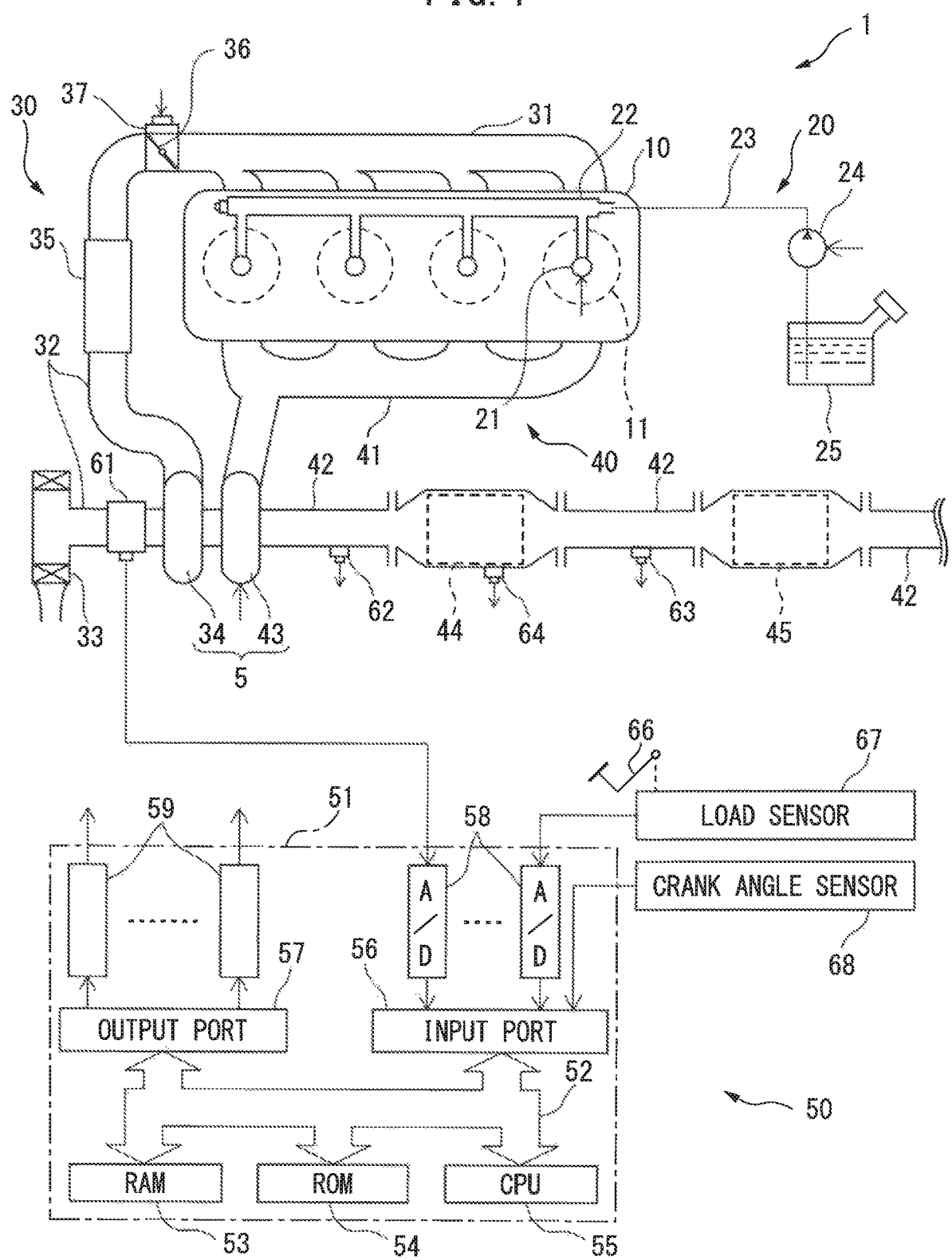
FIG. 1 is a schematic view of the configuration of an internal combustion engine.

Below, referring to the drawings, embodiments of the present invention will be explained in detail. Note that, in the following explanation, similar component elements are assigned the same reference numerals.

First Embodiment

Explanation of Internal Combustion Engine as a Whole

First, referring to FIG. 1, the configuration of an internal combustion engine 1 according to first embodiment will be explained. FIG. 1 is a schematic view of the configuration of the internal combustion engine 1. As shown in FIG. 1, the internal combustion engine 1 is provided with an engine body 10, fuel feed system 20, intake system 30, exhaust system 40 and control device 50.

The engine body 10 is provided with a cylinder block in which a plurality of cylinders 11 are formed, a cylinder head and a crank case. A piston 14 is arranged in each cylinder 11, and each cylinder 11 is connected to intake ports and exhaust port.

The fuel feed system 20 is provided with fuel injectors 21, a delivery pipe 22, fuel feed pipe 23, fuel pump 24, and fuel tank 25. Each fuel injector 31 is arranged in the cylinder head so as to directly inject fuel into each cylinder 11. The fuel pumped out by the fuel pump 24 is supplied through the fuel feed pipe 23 to the delivery pipe 22, and then is injected from the fuel injector 21 into the cylinder 11.

The intake system 30 is provided with an intake manifold 31, intake pipe 32, air cleaner 33, compressor 34 of a turbocharger 5, intercooler 35, and throttle valve 36. The intake port of each cylinder 11 is communicated through the intake manifold 31 and the intake pipe 32 with the air cleaner 33. The intake pipe 43 is provided with the compressor 34 of the exhaust turbocharger 5 for compressing and discharging intake air flowing through the intake pipe 32, and the intercooler 35 for cooling the air compressed by the compressor 34. The throttle valve 36 is driven so as to be opened and closed, by a throttle valve drive actuator 37. The intake port, intake manifold 31 and intake pipe 32 form an intake passage.

The exhaust system 40 is provided with an exhaust manifold 41, exhaust pipe 42, turbine 43 of the exhaust turbocharger 5, exhaust purification catalyst 44, and electrochemical reactor (hereinafter, simply referred to as "reactor") 45. The exhaust port of each cylinder 11 is communicated through the exhaust manifold 51 and the exhaust pipe 52 with the exhaust purification catalyst 44, and the exhaust purification catalyst is communicated through the exhaust pipe 42 with the electrochemical reactor 45. The exhaust purification catalyst 44 is, for example, a three-way catalyst or NOx storage reduction catalyst, and purify composition in the exhaust gas, such as NOx or unburned HC when the temperature thereof is equal to or greater than a constant activation temperature. In the exhaust pipe 42, the turbine 43 of the exhaust turbocharger 5, which is driven to rotate by the energy of the exhaust gas, is provided. The exhaust port, exhaust manifold 41, exhaust pipe 42, exhaust purification catalyst 44 and reactor 45 form an exhaust passage. Note that the exhaust purification catalyst 44 may be provided downstream side of the reactor 45 in the flow direction of the exhaust gas.

The control device 50 is provided with an electronic control unit (ECU) 51 and various types of sensors. The ECU 51 is comprised of a digital computer, and is provided with components connected with each other through a bidirectional bus 52, such as a RAM (random access memory) 53, ROM (read only memory) 54, CPU (microprocessor) 55, input port 56, and output port 57.

At the intake pipe 32, a flow rate sensor (air-flow meter) 61 is provided for detecting the flow rate of air flowing through the intake pipe 32. At the exhaust pipe 42 (or at the exhaust manifold 41) upstream side of the exhaust purification catalyst 44, an air-fuel ratio sensor is provided for detecting the air-fuel ratio of the exhaust gas flowing into the exhaust purification catalyst 44. In addition, at the exhaust pipe 42 downstream side of the exhaust purification catalyst and upstream side of the reactor 45, a NOx sensor is provided for detecting the NOx concentration of the exhaust gas flowing into the reactor 45. Further, at the exhaust purification catalyst, a temperature sensor 64 is provided for detecting the temperature of the exhaust purification catalyst 44. The outputs of these flow rate sensor 61, air-fuel ratio sensor 62, NOx sensor 63 and temperature sensor 64 are input through corresponding AD converters 58 to the input port 56.

Further, a load sensor 67 generating an output voltage proportional to the amount of depression of an accelerator pedal 66 is connected to the input port 56. The output voltage of the load sensor 67 is input through a corresponding AD converter 58 to the input port 56. A crank angle sensor 68 generates an output pulse every time the crankshaft of the engine body 10 rotates by for example 10 degrees. This output pulse is input to the input port 56. At the CPU 55, the engine speed is calculated from the output pulse.

On the other hand, the output port 57 of the ECU 51 is connected through corresponding driver circuits 59 to the actuators controlling the operation of the internal combustion engine 1. In the example shown in FIG. 1, the output port 57 is connected to the fuel injectors 21, fuel pump 24 and throttle valve drive actuator 37. The ECU 51 outputs control signals controlling these actuators from the output port 57 to control the operation of the internal combustion engine 1.

Configuration of Electrochemical Reactor

Figure 2:
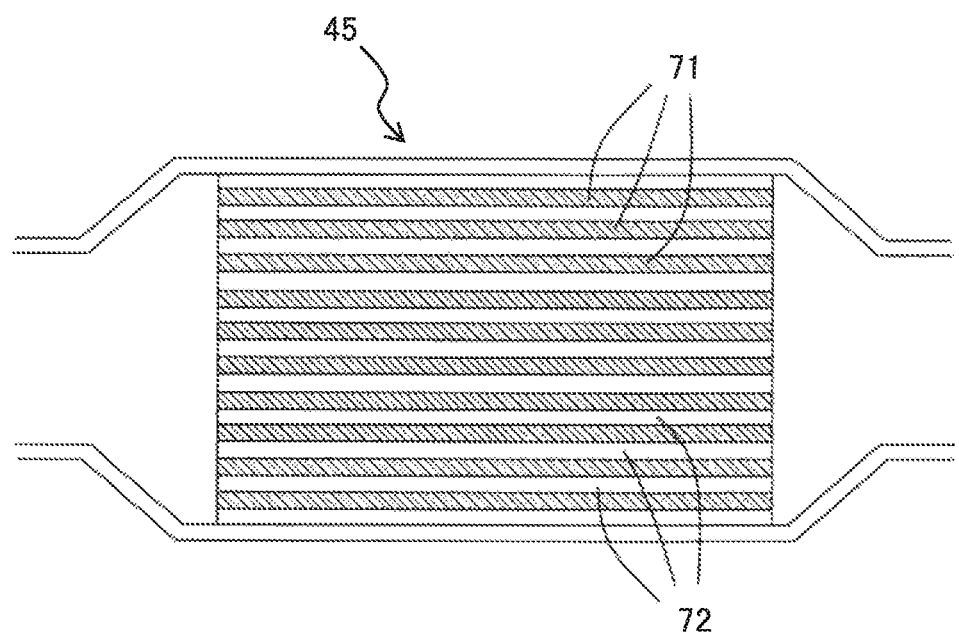
FIG. 2 is a cross-sectional side view of an electrochemical reactor.

Next, referring to FIGS. 2 and 3, the configuration of the reactor 45 according to the present embodiment will be explained. FIG. 2 is a cross-sectional side view of the reactor 45. As shown in FIG. 2, the reactor 45 is provided with partition walls 71 and passages 72 defined by the partition walls. The partition walls 71 are comprised of a plurality of first partition walls extending in parallel with each other and a plurality of second partition walls extending in parallel with each other and perpendicular to the first partition walls. The passages 72 are defined by these first partition walls and second partition walls, and extend in parallel to each other. Therefore, the reactor 45 according to the present embodiment has a honeycomb structure. The exhaust gas flowing into the reactor 45 flows through the plurality of passages 72.

Figure 3:
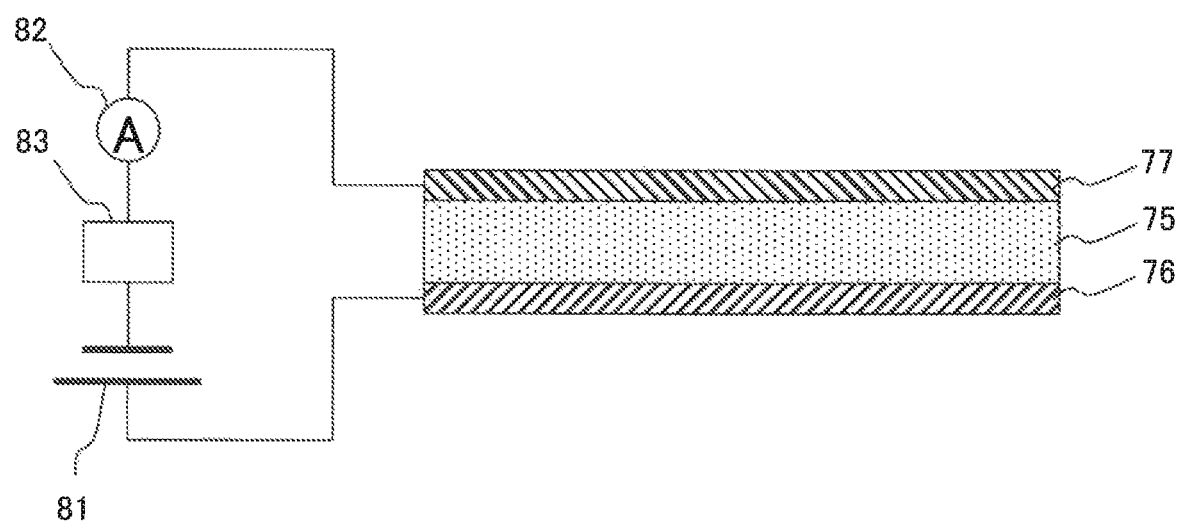
FIG. 3 is an enlarged cross-sectional view schematically showing a partition wall of the electrochemical reactor.

FIG. 3 is an enlarged cross-sectional view of a partition wall 71 of the reactor 45. As shown in FIG. 3, a partition wall 71 of the reactor 45 is provided with a solid electrolyte layer 75, an anode layer 76 arranged on one surface of the solid electrolyte layer 75, and a cathode layer 77 arranged on the surface of the solid electrolyte layer 75 at the opposite side to the surface at which the anode layer 76 is arranged.

The solid electrolyte layer 75 includes a porous solid electrolyte having proton conductivity. As the solid electrolyte, for example, a perovskite type metal oxide $MM'_{1-x}R_xO_{3-\alpha}$ (M=Ba, Sr, Ca, M'=Ce, Zr, R=Y, Yb, for example, $SrZr_xYb_{1-x}O_{3-\alpha}$, $SrCeO_3$, $BaCeO_3$, $CaZrO_3$, $SrZrO_3$, etc.), a phosphate (for example, $SiO_2$—$P_2O_5$-based glass, etc.), metal doped $Sn_xIn_{1-x}P_2O_7$ (for example, $SnP_2O_7$, etc.) or zeolite (for example, ZSM-5) are used.

The anode layer 76 and the cathode layer 77 both include Pt, Pd, Rh, or other precious metals. Further, the anode layer 76 includes a substance able to hold (that is, able to adsorb and/or absorb) water molecules. Specifically, the substance able to hold water molecules includes zeolite, silica gel, activated alumina, etc. On the other hand, the cathode layer 77 includes a substance able to hold (that is, able to adsorb and/or absorb) $NO_X$. Specifically, the substance able to hold $NO_X$ includes K, Na, or another alkali metal, Ba or another alkali earth metal, La or another rare earth, etc.

Further, the internal combustion engine 1 is provided with a power system 81, ammeter 82 and current adjustment system 83. The positive electrode of the power system 81 is connected to the anode layer 76, while the negative electrode of the power system 81 is connected to the cathode layer 77. The current adjustment system 83 is configured to be able to change the magnitude of the current provided to the reactor 45 so as to flow from anode layer 76 through the solid electrolyte layer 75 to the cathode layer 77, and. Further, the current adjustment system 83 is configured to be able to change the voltage applied across the anode layer 76 and the cathode layer 77.

The power system 81 is connected to the ammeter 82 in series. Further, the ammeter 82 is connected through a corresponding AD converter 58 to the input port 56. The current adjustment system 83 is connected through a corresponding drive circuit 59 to the output port 57 of the ECU 51. The current adjustment system 83 is controlled by the ECU 51. Therefore, the current adjustment system 83 and ECU 51 function as a current control device for controlling the magnitude of current flowing from the anode layer 76 through the solid electrolyte layer 75 to the cathode layer 77. In particular, in the present embodiment, the current adjustment system 83 is controlled so that the current value detected by the ammeter 82 becomes a target value.

In the reactor 45 configured as above, if current flows from the power system 81 to the anode layer 76 and the cathode layer 77, reactions such as in the following formulas occur at the anode layer 76 and the cathode layer 77:

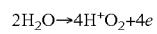

$$2H_2O \rightarrow 4H^+O_2+4e \qquad \text{Anode side:}$$

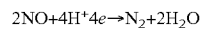

$$2NO+4H^+4e \rightarrow N_2+2H_2O \qquad \text{Cathode side:}$$

That is, in the anode layer 76, the water molecules held at the anode layer 76 are electrolyzed whereby oxygen and protons are generated. The generated oxygen is released into the exhaust gas, while the generated protons move from the anode layer 76 through the solid electrolyte layer 75 to the cathode layer 77. In the cathode layer 77, the NO held at the cathode layer 77 reacts with the protons and electrons whereby nitrogen and water molecules are generated.

Therefore, according to the present embodiment, by making current flow from the power system 81 of the reactor 45 to the anode layer 76 and the cathode layer 77, it is possible to reduce the NO in the exhaust gas to $N_2$ to remove it.

Note that, in the above embodiments, the anode layer 76 and the cathode layer 77 are arranged on two surfaces at the opposite sides of the solid electrolyte layer 75. However, the anode layer 76 and the cathode layer 77 may also be arranged on the same surface of the solid electrolyte layer 75. In this case, the protons move through the vicinity of the surface of the solid electrolyte layer 75 at which the anode layer 76 and the cathode layer 77 are arranged.

Figure 4:
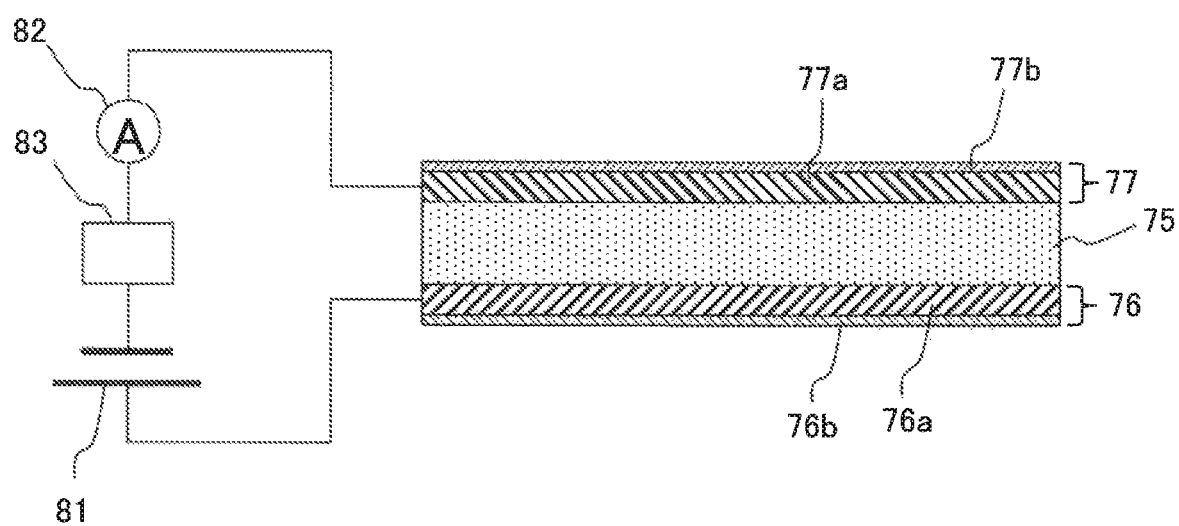
FIG. 4 is an enlarged cross-sectional view schematically showing a partition wall of the electrochemical reactor.

Further, as shown in FIG. 4, the anode layer 76 may include two layers of a conductive layer 76a including a precious metal having electroconductivity and a water molecule holding layer 76b including a substance able to hold water molecules. In this case, the conductive layer 76a is arranged on the surface of the solid electrolyte layer 75, while the water molecule holding layer 76b is arranged on the surface of the conductive layer 76a at the opposite side from the solid electrolyte layer 75 side.

Similarly, the cathode layer 77 may include two layers of a conductive layer 77a including a precious metal having electroconductivity and an $NO_X$ holding layer 77b including a substance able to hold $NO_X$. In this case, the conductive layer 77a is arranged on the surface of the solid electrolyte layer 75, while the $NO_X$ holding layer 77b is arranged on the surface of the conductive layer 77a at the opposite side from the solid electrolyte layer 75 side.

Note that, in the present embodiment, the solid electrolyte layer 75 of the reactor 45 includes a proton conductive solid electrolyte. However, the solid electrolyte layer 75 may also be configured to include an oxygen ion conductive solid electrolyte or other ion conductive solid electrolyte, instead of a proton conductive solid electrolyte.

Control of Electrochemical Reactor

Figure 5:
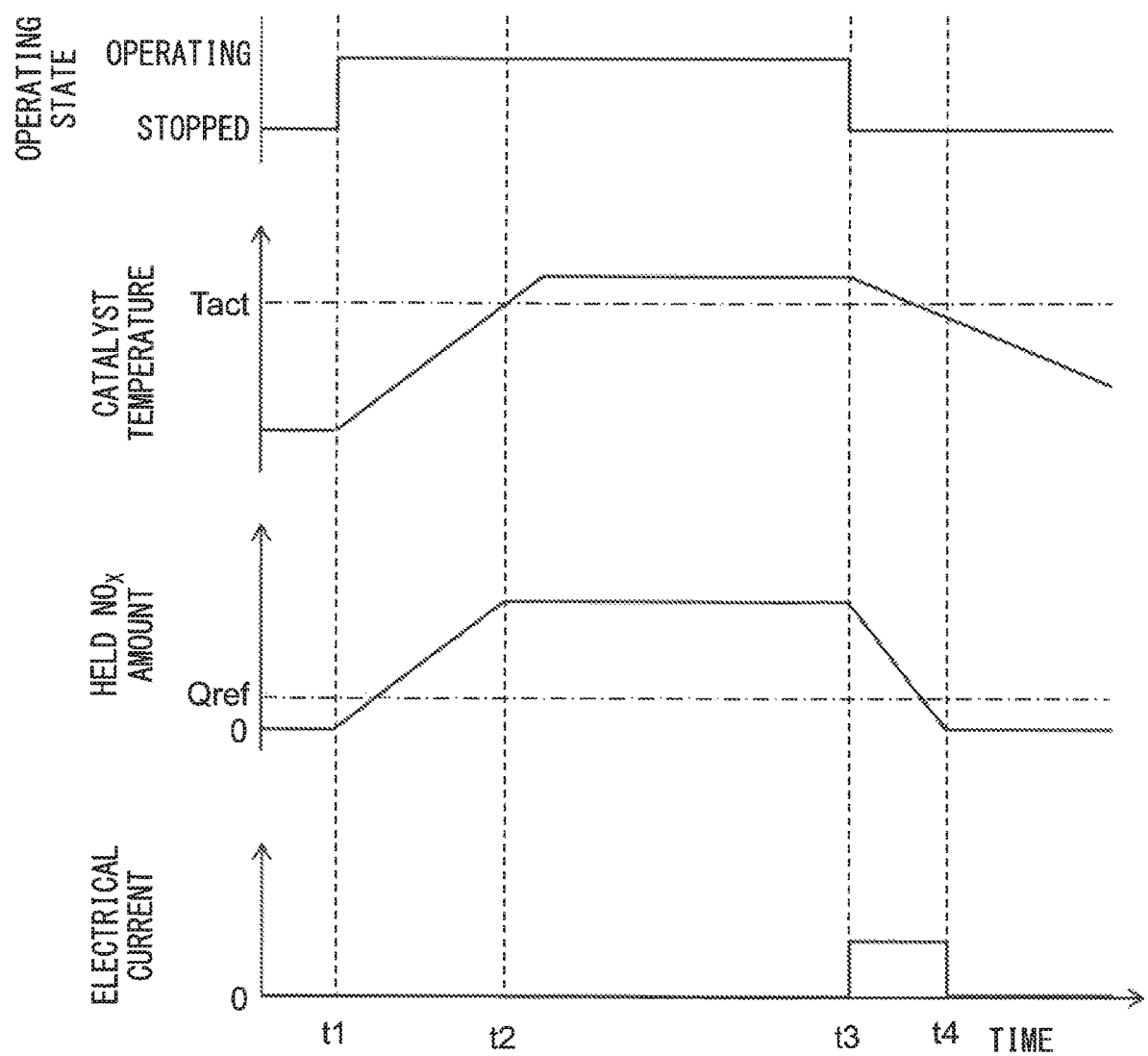
FIG. 5 is a time chart of an operating state of an internal combustion engine, a temperature of an exhaust purification catalyst, a held $NO_X$ amount, and supplied current.

Next, referring to FIG. 5, the control of the reactor 45 configured as explained above will be explained. FIG. 5 is a time chart of the operating state of the internal combustion engine 1, the temperature of the exhaust purification catalyst 44, the amount of $NO_X$ held at the cathode layer 77 of the reactor 45, and the current supplied to the reactor 45.

In the example shown in FIG. 5, at the time t1, the internal combustion engine 1 is started in a state where the temperature of the internal combustion engine 1 is low. Therefore, at the time t1, the temperature of the exhaust purification catalyst 44 is lower than the activation temperature Tact.

If at the time t1 the internal combustion engine 1 is started, the exhaust gas of the internal combustion engine 1 causes the temperature of the exhaust purification catalyst 44 to rise. Further, the temperature of the exhaust purification catalyst 44 is lower than the activation temperature, and therefore the $NO_X$ in the exhaust gas is not removed at the exhaust purification catalyst 44 and flows into the reactor 45. If $NO_X$ flows into the reactor 45, it will be held at the cathode layer 77 of the reactor 45. In the example of FIG. 5, at this time, the reactor 45 is not being supplied with current, and therefore the $NO_X$ held at the cathode layer 77 is not removed but is maintained as held. As a result, after the time t1, the amount of $NO_X$ held at the cathode layer 77 increases.

Then, if, at the time t2, the temperature of the exhaust purification catalyst 44 reaches the activation temperature, the $NO_X$ in the exhaust gas is removed by the exhaust purification catalyst 44. Therefore, the exhaust gas flowing into the reactor 45 does not contain almost any $NO_X$ and accordingly the amount of $NO_X$ held at the cathode layer 77 does not change.

In the example shown in FIG. 5, after that, at the time t3, the internal combustion engine 1 is stopped. That is, at the time t3, the rotational speed of the crankshaft of the internal combustion engine 1 becomes 0. In the present embodiment, current is supplied to the reactor 45 while the internal combustion engine 1 is stopped. Therefore, in the example shown in FIG. 5, if, at the time t3, the internal combustion engine 1 is stopped, current starts to be supplied to the reactor 45. If current is supplied to the reactor 45, the $NO_X$ held in the cathode layer 77 of the reactor 45 is purified and accordingly the amount of $NO_X$ held at the cathode layer 77 is gradually decreased.

In the example shown in FIG. 5, at the time t4, the amount of $NO_X$ held at the cathode layer 77 becomes substantially zero. Therefore, at the time t4, the supply of current to the reactor 45 is stopped.

Figure 6:
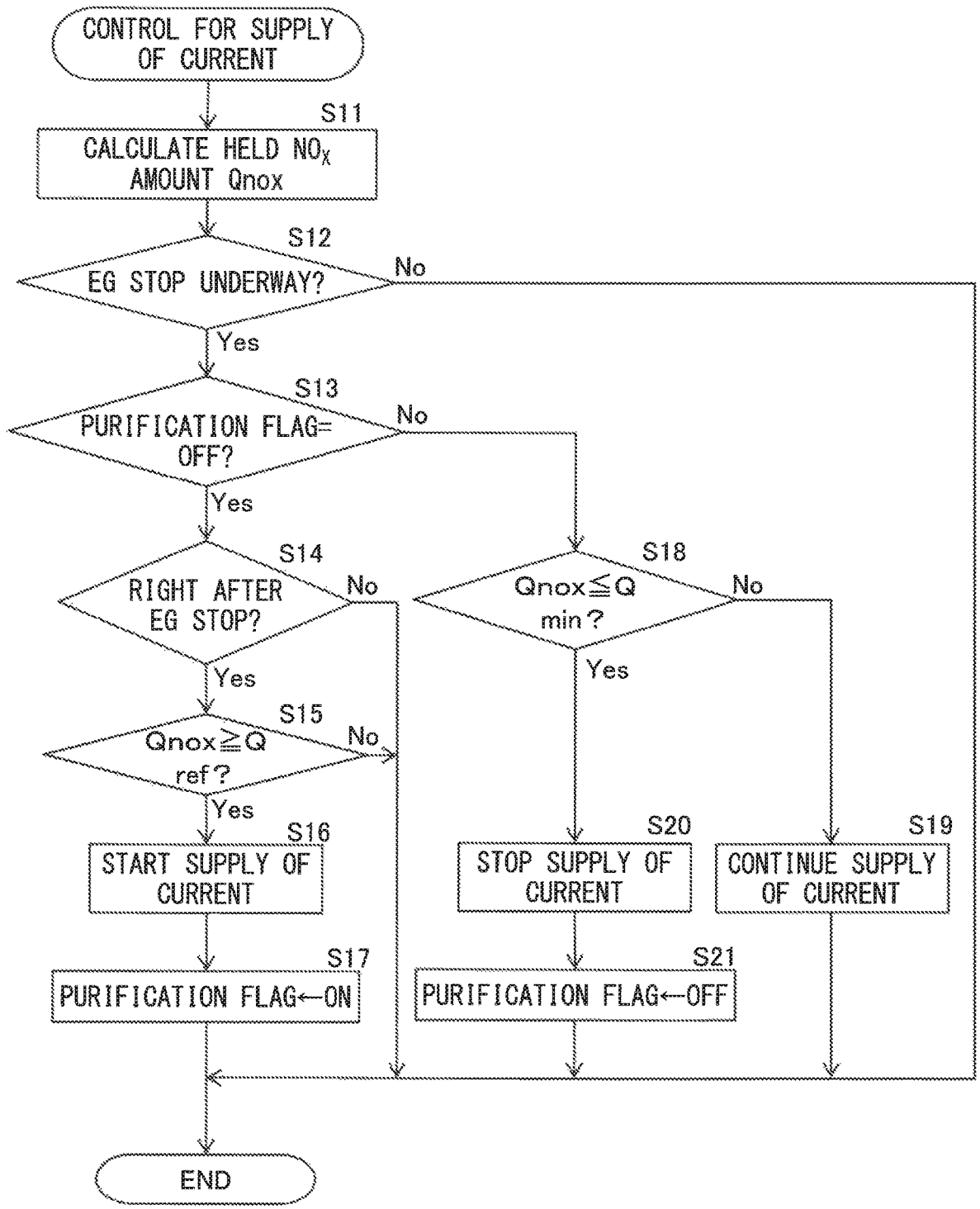
FIG. 6 is a flow chart showing a control routine of control for supply of current to an electrochemical reactor of an internal combustion engine according to a first embodiment.

FIG. 6 is a flow chart showing a control routine of control for supplying current to the reactor 45 in the internal combustion engine 1 according to the first embodiment. The illustrated control routine is executed every certain time interval.

As shown in FIG. 6, first, at step S11, the amount of $NO_X$ held at the cathode layer 77 of the reactor 45 is calculated. The held $NO_X$ amount Qnox of the cathode layer 77 is, for example, calculated by the following formula (1):

$$Qnox_n = Qnox_{n-1} + Qin - Qred - Qout \quad (1)$$

In the above formula (1), the suffix "n" means the value calculated at the current control routine, while the suffix n−1 means the value calculated at the previous control routine. Qin expresses the amount of $NO_X$ flowing into the reactor 45 during the execution intervals of the control routine (inflowing $NO_X$ amount), while Qred expresses the amount of $NO_X$ purified at the reactor 45 during the execution intervals of the control routine (purified $NO_X$ amount). In addition, Qout expresses the amount of $NO_X$ flowing out from the reactor 45 during the execution intervals of the control routine (outflowing $NO_X$ amount).

The inflowing $NO_X$ amount Qin is, for example, calculated by multiplying the flow rate of the exhaust gas with the $NO_X$ concentration detected by the $NO_X$ sensor 63 arranged at the upstream side of the reactor 45. The purified $NO_X$ amount Qred, for example, is calculated based on the magnitude of the current supplied to the reactor 45. The outflowing $NO_X$ amount Qout, for example, is calculated by multiplying the flow rate of exhaust gas with the $NO_X$ concentration detected by the $NO_X$ sensor (not shown) arranged at the downstream side of the reactor 45. Note that, the inflowing $NO_X$ amount Qin, purified $NO_X$ amount Qred, and outflowing $NO_X$ amount Qout may be calculated by methods different from the above methods as well. In addition, the held $NO_X$ amount Qnox of the cathode layer 77 may also be calculated by a method different from the above method.

Next, at step S12, it is judged if the internal combustion engine 1 is stopped. Specifically, for example, this is judged based on the engine rotational speed calculated based on the output of the crank angle sensor 68. If the engine rotational speed is 0, it is judged that the internal combustion engine 1 has stopped, while of the engine rotational speed is larger than 0, it is judged that the internal combustion engine 1 is operating. If at step S12 it is judged that the internal combustion engine 1 has not stopped, the control routine is ended. On the other hand, if at step S12 it is judged that the internal combustion engine 1 has stopped, the routine proceeds to step S13.

At step S13, it is judged if the purification flag is set to OFF. The purification flag is a flag which is set to ON when current is supplied to the reactor 45 and the $NO_X$ held at the cathode layer 77 is purified while is set to OFF at other times. When at step S13 it is judged that the purification flag is set to OFF, the routine proceeds to step S14.

At step S14, it is judged if the internal combustion engine 1 has just stopped. Specifically, it is judged if the engine rotational speed was a value larger than 0 in the previous control routine. If at step S14 it is judged that the internal combustion engine 1 has not just stopped, the control routine is ended. On the other hand, if at step S14 it is judged that the internal combustion engine 1 has just stopped, the routine proceeds to step S15.

At step S15, it is judged if the held $NO_X$ amount Qnox calculated at step S11 is equal to or greater than a predetermined reference amount Qref. The reference amount Qref, for example, is set to, for example, ⅓ or ⅙ of the maximum storable amount of $NO_X$ of the cathode layer 77. If at step S15, it is judged that the held $NO_X$ amount Qnox is less than the reference amount Qref, the amount of $NO_X$ held at the cathode layer 77 is small, and therefore the control routine is ended without purifying the $NO_X$ held at the cathode layer 77. Therefore, when the held $NO_X$ amount Qnox is less than the reference amount Qref, the supply of current to the reactor 45 is not started.

On the other hand, if at step S15 it is judged that the held $NO_X$ amount Qnox is equal to or greater than the reference amount Qref, the routine proceeds to step S16. At step S16, the supply of current to the reactor 45 is started, then at step S17 the purification flag is set to ON and the control routine is ended.

If the supply of current to the reactor 45 is started and the purification flag is set to ON, at the next control routine, at step S13, it is judged that the purification flag is set to ON and the routine proceeds to step S18. At step S18, it is judged if the held $NO_X$ amount Qnox calculated at step S11 is equal to or less than the predetermined minimum amount Qmin. The minimum amount Qmin is a value close to zero. If, at step S18, it is judged that the held $NO_X$ amount Qnox is larger than the minimum amount Qmin, that is, if it is judged that the cathode layer 77 still holds $NO_X$, the routine proceeds to step S19. At step S19, the supply of current to the reactor 45 is continued and the control routine is ended.

On the other hand, if at step S18 it is judged that the held $NO_X$ amount Qnox is equal to or less than the minimum amount Qmin, that is, if it is judged that the cathode layer 77 does not hold much $NO_X$ at all, the routine proceeds to step S20. At step S20, the supply of current to the reactor 45 is stopped, then at step S21, the purification flag is set OFF and the control routine is ended.

Action and Effect

In this regard, in the first embodiment, at the time of cold start of the internal combustion engine 1, that is, when the temperature of the exhaust purification catalyst is low, the exhaust purification catalyst 44 cannot suitably purify the $NO_X$. Therefore, at the time of cold start of the internal combustion engine 1, it is necessary to hold the $NO_X$ in the exhaust gas flowing out from the exhaust purification catalyst 44 at the cathode layer 77 of the reactor 45.

On the other hand, the ability of the cathode layer 77 of the reactor 45 to hold $NO_X$ is higher as the amount of $NO_X$ held at the cathode layer 77 is smaller. Conversely, if the cathode layer 77 holds a large amount of $NO_X$, the cathode layer 77 cannot hold further $NO_X$ and accordingly the $NO_X$ in the exhaust gas cannot be newly held at the cathode layer 77.

According to the present embodiment, by supplying current to the reactor 45 at least temporarily while the internal combustion engine 1 is stopped, it is possible to reduce the amount of $NO_X$ held at the cathode layer 77 while the internal combustion engine 1 is stopped. Therefore, at the time of cold start of the internal combustion engine 1, the amount of $NO_X$ held at the cathode layer 77 is smaller and therefore the ability of the cathode layer 77 to hold the $NO_X$ is high. Therefore, at the time of cold start of the internal combustion engine 1, even if the temperature of the exhaust purification catalyst 44 is low and thus cannot sufficiently purify $NO_X$, it is possible for the cathode layer 77 of the reactor 45 to hold $NO_X$. Further, the $NO_X$ held at the cathode layer 77 is purified by supplying current to the reactor 45.

Modification

In the above first embodiment, regardless of the temperature of the exhaust purification catalyst 44, current was supplied to the reactor 45 while the internal combustion engine 1 was stopped. However, even if the internal combustion engine 1 is stopped, if the internal combustion engine 1 is restarted while the temperature of the exhaust purification catalyst 44 is equal to or greater than the activation temperature, the exhaust purification catalyst 44 can purify the $NO_X$. Therefore, there is not necessarily a need to decrease the amount of $NO_X$ held at the cathode layer 77. Therefore, the current control device according to a modification of the first embodiment is configured so as not to supply current to the reactor 45 even while the internal combustion engine 1 is stopped, if the temperature of the exhaust purification catalyst 44 is equal to or greater than the activation temperature.

Figure 7:
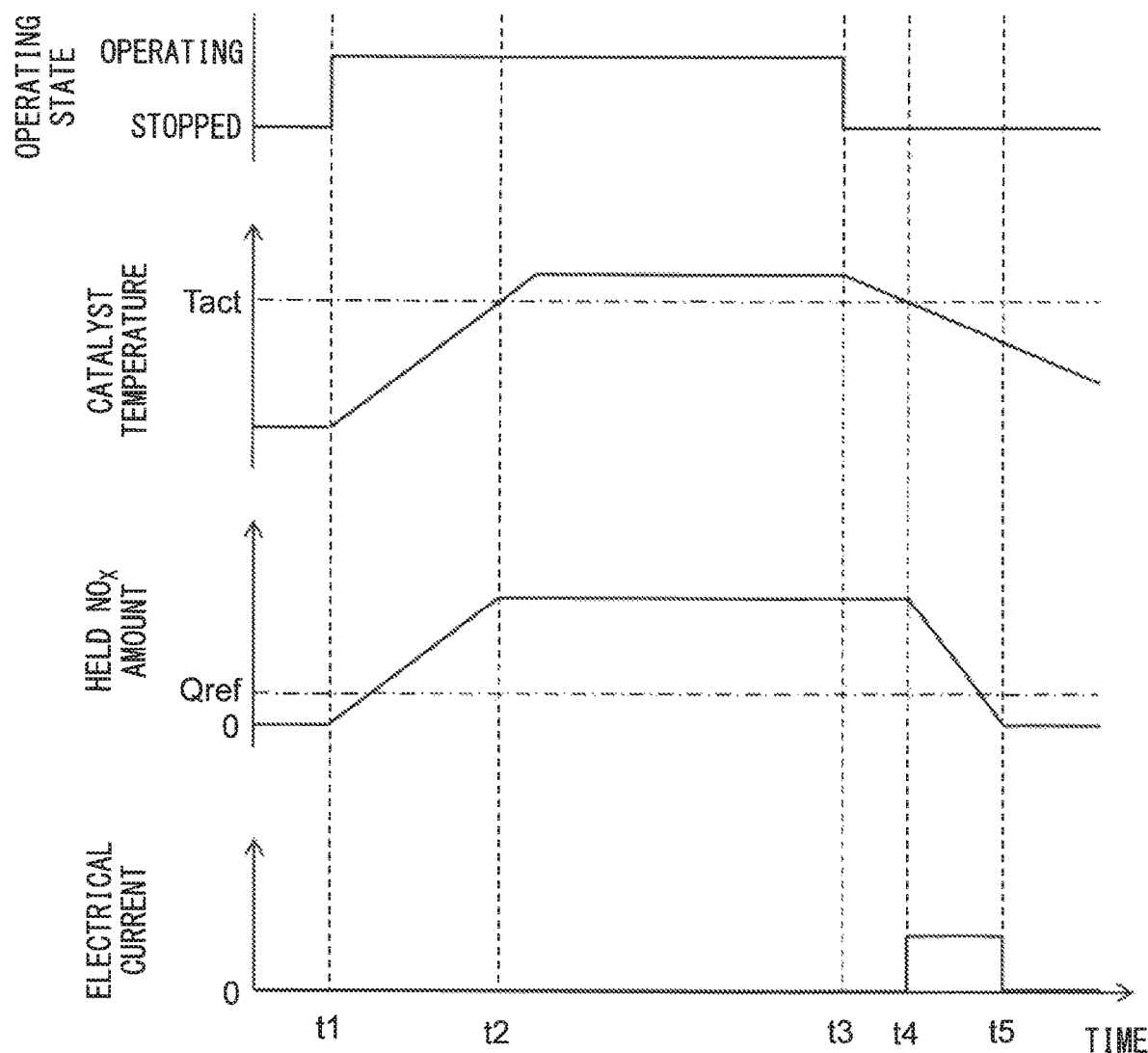
FIG. 7 is a time chart, similar to FIG. 5, when supplying current to an electrochemical reactor in a modification of the first embodiment.

FIG. 7 is a time chart, similar to FIG. 5, of the time when supplying current to the reactor 45 according to the present modification. In the example shown in FIG. 7 as well, in the same way as the example shown in FIG. 5, the internal combustion engine 1 is stopped at the time t3. However, at this time, the temperature of the internal combustion engine 1 is the equal to or greater than activation temperature Tact, and therefore current is not supplied to the reactor 45. Then, if at the time t4 the temperature of the exhaust purification catalyst 44 becomes less than the activation temperature Tact, the supply of current to the reactor 45 is started. Further, if current is supplied to the reactor 45 and at the time t5 the amount of $NO_X$ held at the cathode layer 77 is decreased to about zero (equal to or less than minimum amount Qmin), the supply of current to the reactor 45 is stopped.

Figure 8:
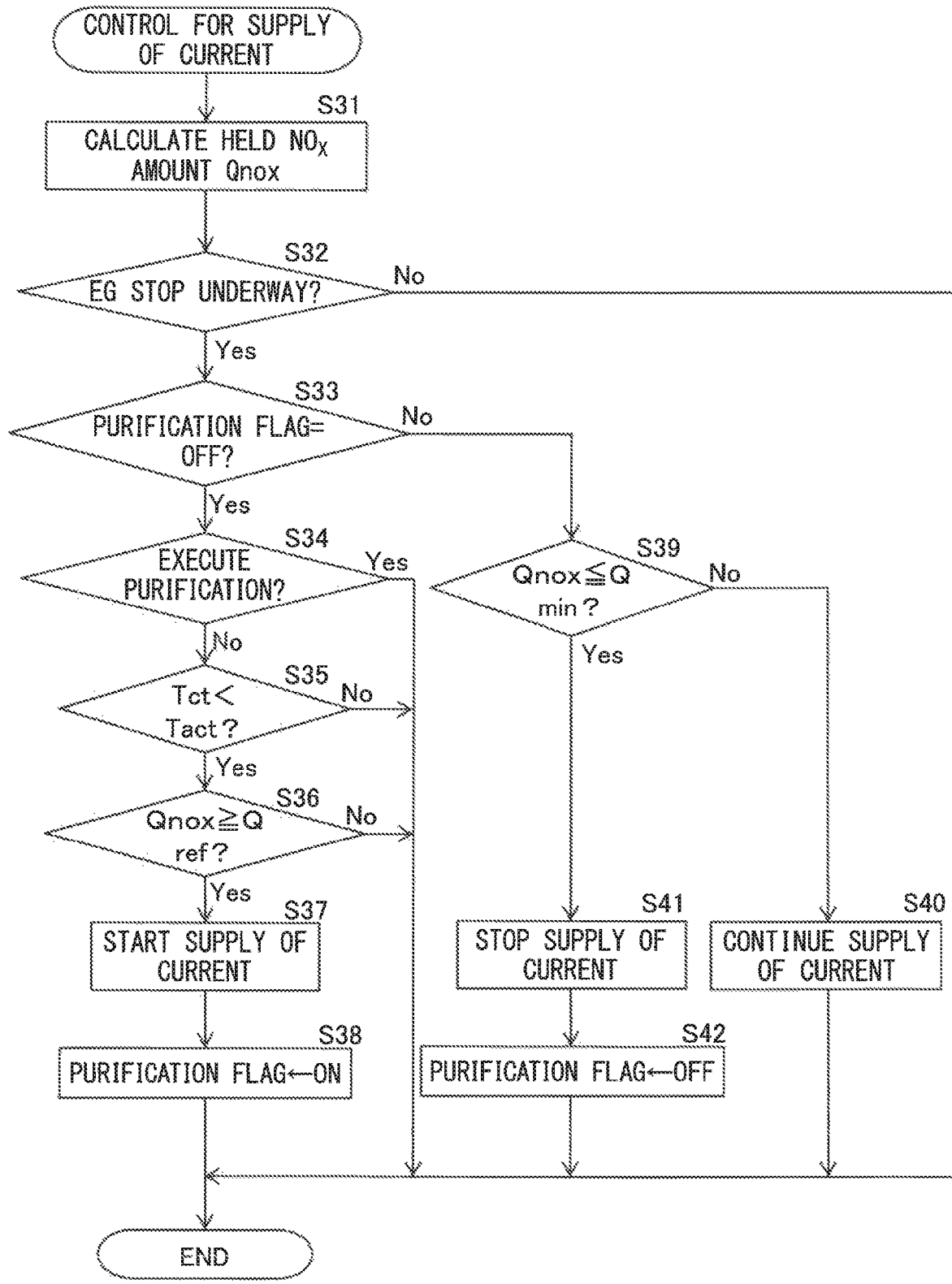
FIG. 8 is a flow chart showing a control routine of control for supply of current to an electrochemical reactor of an internal combustion engine according to a modification of the first embodiment.

FIG. 8 is a flow chart showing a control routine of control for supply of current to the reactor 45 in the internal combustion engine 1 according to the modification of the first embodiment. The illustrated control routine is performed every certain time interval. Steps S31 to S33 of FIG. 8 are respectively similar to steps S11 to S13 of FIG. 6, while steps S36 to S42 of FIG. 8 are respectively similar to steps S15 to S21 of FIG. 6, and therefore explanation of these steps will be omitted.

As shown in FIG. 8, if at step S33 it is judged that the purification flag is set OFF, the routine proceeds to step S34. At step S34, it is judged if NOx has been purified at the reactor 45 while the internal combustion engine 1 is currently stopped, that is, if current was supplied to the reactor 45 while the internal combustion engine 1 is currently stopped. If at step S34 it is judged that the exhaust has been purified at the reactor 45, the control routine is ended. On the other hand, if at step S34 it is judged that the exhaust has not been purified at the reactor 45 while the internal combustion engine 1 is currently stopped, the routine proceeds to step S35.

At step S35, it is judged if the temperature Tct of the exhaust purification catalyst 44 detected by the temperature sensor 64 is less than the activation temperature Tact. If it is judged that the temperature Tct of the exhaust purification catalyst 44 is equal to or greater than the activation temperature Tact, the control routine is ended. On the other hand, if it is judged that the temperature Tct of the exhaust purification catalyst 44 is less than the activation temperature Tact, the routine proceeds to step S36. Note that, the temperature Tct of the exhaust purification catalyst 44 may be estimated, without using the temperature sensor 64, for example, by the engine load detected by the load sensor 67 or the engine rotational speed.

Second Embodiment

Next, referring to FIGS. 9 to 12, an internal combustion engine 1 according to a second embodiment will be explained. The configuration and control of the internal combustion engine 1 according to the second embodiment are basically similar to the configuration and control of the internal combustion engine 1 according to the first embodiment. Below, the explanation will be given focused on the parts different from the internal combustion engine 1 according to the first embodiment.

In the above first embodiment, the current control device was configured to supply current to the reactor 45 only while the internal combustion engine 1 was stopped. As opposed to this, in the present embodiment, the current control device is configured so as to supply current to the reactor 45 at least temporarily even while the internal combustion engine 1 is operating.

Control of Electrochemical Reactor

Figure 9:
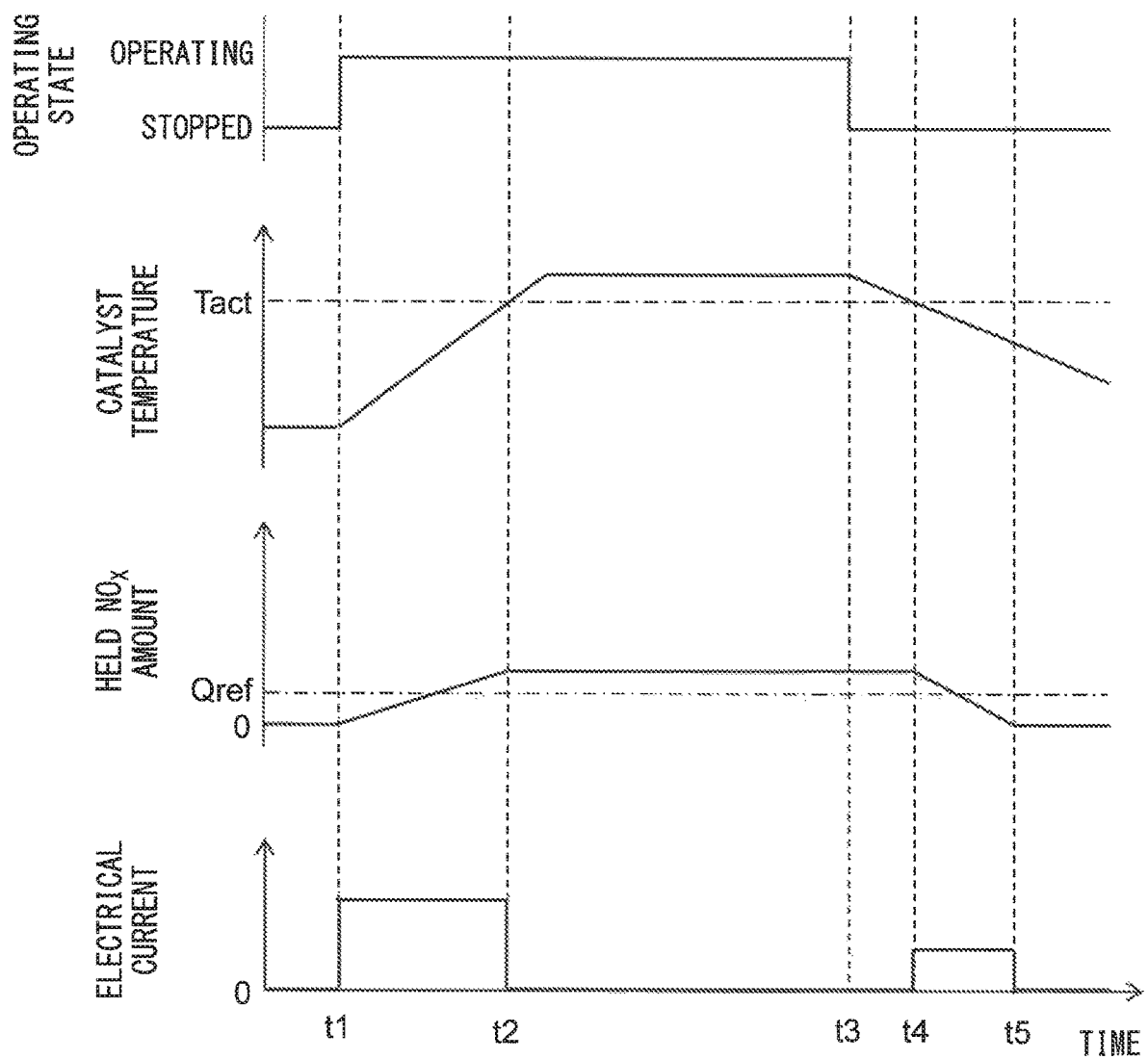
FIG. 9 is a time chart, similar to FIG. 7, in an internal combustion engine according to a second embodiment.

FIG. 9 is a time chart similar to FIG. 7 in the internal combustion engine 1 according to the second embodiment. In the example shown in FIG. 9 as well, at the time t1, the internal combustion engine 1 is started in the state of a low temperature of the internal combustion engine 1. Therefore, at the time t1, the temperature of the exhaust purification catalyst 44 is lower than the activation temperature Tact.

If at the time t1 the internal combustion engine 1 is started, since the temperature of the exhaust purification catalyst 44 is low, exhaust gas containing $NO_X$ flows into the reactor 45 and the $NO_X$ in the exhaust gas is held at the cathode layer 77. In addition, in the present embodiment, at the time t1, supply of current to the reactor 45 is started. Therefore, the $NO_X$ held at the cathode layer 77 is purified.

Here, in the present embodiment, a current smaller than the current by which all of the $NO_X$ held at the cathode layer 77 is purified from the exhaust gas, is supplied to the reactor 45. Therefore, although part of the $NO_X$ held at the cathode layer 77 is purified, the amount of $NO_X$ held at the cathode layer 77 gradually increases.

Then, if at the time t2 the temperature of the exhaust purification catalyst 44 reaches the activation temperature, the $NO_X$ in the exhaust gas is purified at the exhaust purification catalyst 44. Therefore, the exhaust gas flowing into the reactor 45 does not contain almost any $NO_X$ at all. On the other hand, in the reactor 45 provided with the proton conductive solid electrolyte layer 75, if the temperature becomes higher, at the cathode layer 77, protons react with the oxygen more than the $NO_X$. For this reason, if the temperature of the reactor 45 is higher, the rate of removal of $NO_X$ falls relative to the current supplied to the reactor 45. Therefore, in the present embodiment, if the temperature of the exhaust purification catalyst 44 is equal to or greater than the activation temperature, supply of current to the reactor 45 is stopped. Therefore, after the time t2, the amount of $NO_X$ held at the cathode layer 77 does not change.

In the example shown in FIG. 9, then, at the time t3, the internal combustion engine 1 is stopped. At the time t4, the temperature of the exhaust purification catalyst 44 becomes less than the activation temperature Tact. For this reason, at the time t4, the supply of current to the reactor 45 is started. The current supplied to the reactor 45 at this time is smaller than the current supplied to the reactor 45 at the time t1 to the time t2. Further, at the time t5 when the amount of $NO_X$ held at the cathode layer 77 becomes substantially zero, the supply of current to the reactor 45 is stopped.

Figure 10:
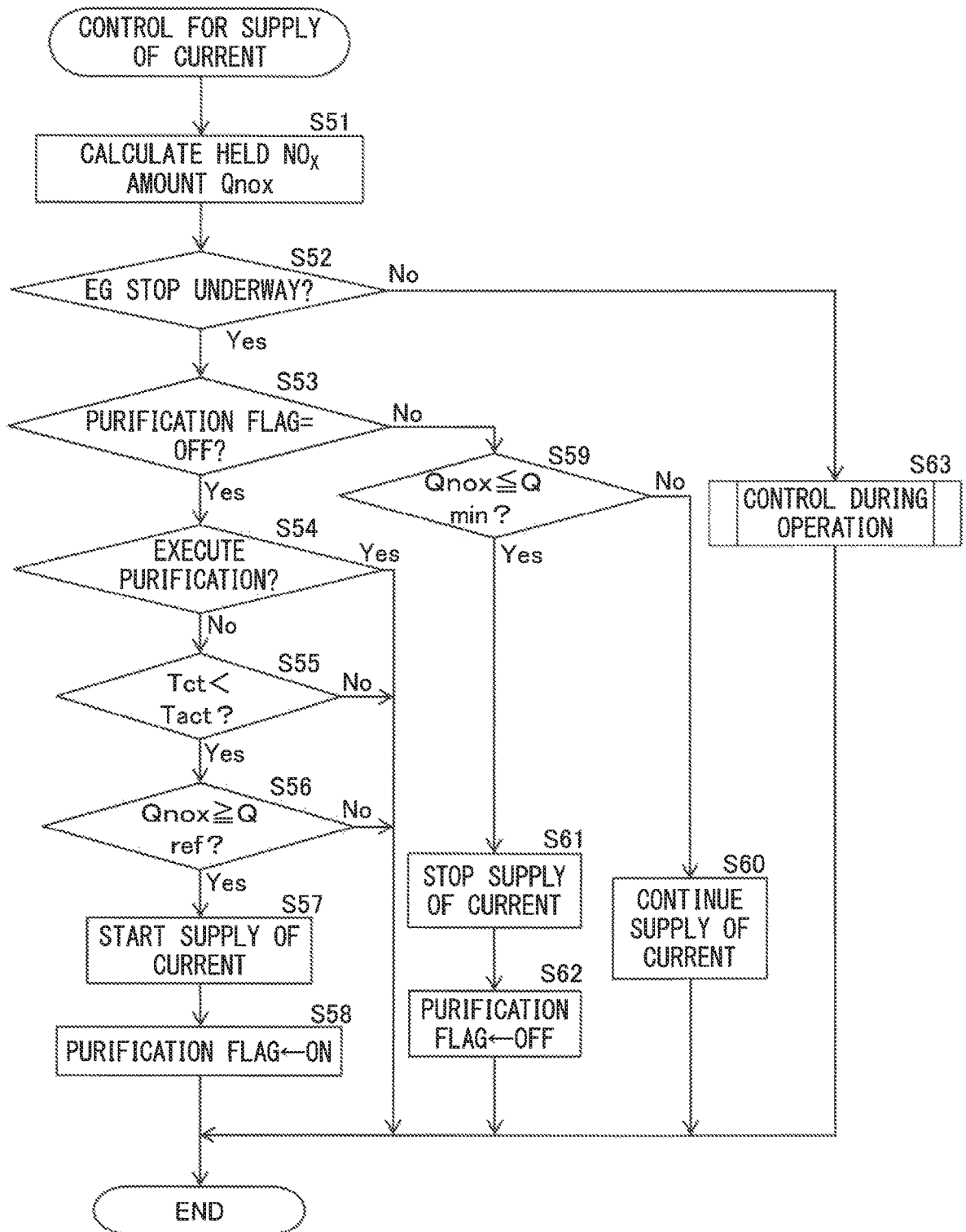
FIG. 10 is a flow chart showing a control routine of control for supply of current to a reactor in the internal combustion engine according to the second embodiment.

FIG. 10 is a flow chart showing the control routine of control for supply of current to the reactor 45 in the internal combustion engine 1 according to the second embodiment. The illustrated control routine is performed every certain time interval. Steps S51 to S62 of FIG. 10 are similar to steps S31 to S42 of FIG. 8, and therefore explanations of these steps will be omitted.

As shown in FIG. 10, if at step S52 it is judged that the internal combustion engine 1 is operating, the routine proceeds to step S63. At step S63, current is supplied to the reactor 45 by the operational control shown in FIG. 11.

Figure 11:
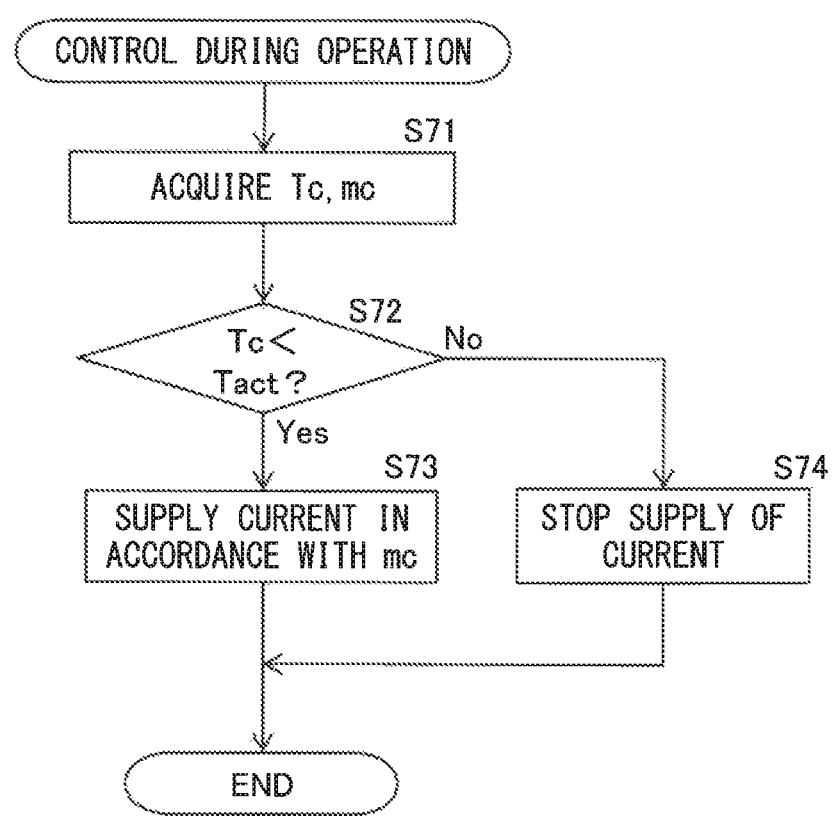
FIG. 11 is a flow chart showing a control routine of control during operation performed at step S63 of FIG. 10.

FIG. 11 is a flow chart showing the control routine of operational control performed at step S63 of FIG. 10. The control routine shown in FIG. 11 is performed every time the control routine of FIG. 10 reaches step S63.

First, at step S71, the temperature Tc of the exhaust purification catalyst 44 and flow rate of intake air mc of the internal combustion engine 1 are acquired. The temperature Tc of the exhaust purification catalyst 44 is detected by the temperature sensor 64, while the flow rate of intake air mc of the internal combustion engine 1 is detected by the flow rate sensor 61.

Next, at step S72, it is judged if the temperature Tc of the exhaust purification catalyst 44 is less than the activation temperature Tact. If it is judged at step S72 that the temperature Tc of the exhaust purification catalyst 44 is less than the activation temperature Tact, the routine proceeds to step S73.

At step S73, the current supplied to the reactor 45 is controlled based on the flow rate of intake air mc of the internal combustion engine 1 acquired at step S71. If the flow rate of intake air mc is great, the flow rate of exhaust gas is large and therefore the $NO_X$ flowing into the reactor 45 increases. Therefore, in the present embodiment, the greater the flow rate of intake air mc becomes, the larger the current supplied to the reactor 45 is made. In addition, in the present embodiment, the current supplied to the reactor 45 at step S73 is set to be larger than the current supplied to the reactor 45 at steps S57 and S60 of FIG. 10. On the other hand, if at step S72 it is judged if the temperature Tc of the exhaust purification catalyst 44 is equal to or greater than the activation temperature Tact, the routine proceeds to step S74. At step S74, the supply of current to the exhaust purification catalyst 44 is stopped and the control routine is ended.

Note that, in the present embodiment, the current supplied to the reactor 45 is controlled in accordance with the flow rate of intake air mc. However, the current supplied to the reactor 45 may also be change based on other parameters. Specifically, for example, the air-fuel sensor 62 may detect the air-fuel ratio of the exhaust gas and the current supplied to the reactor 45 may be controlled based on the detected air-fuel ratio of the exhaust gas. In this case, when the air-fuel ratio of the exhaust gas is a rich air-fuel ratio, the concentration of $NO_X$ in the exhaust gas is low, and therefore the current supplied to the reactor 45 is set lower, while when the air-fuel ratio of the exhaust gas is a lean air-fuel ratio, the concentration of $NO_X$ in the exhaust gas is high, and therefore the current supplied to the reactor 45 may be set higher.

Properties of Electrochemical Reactor

Figure 12A:
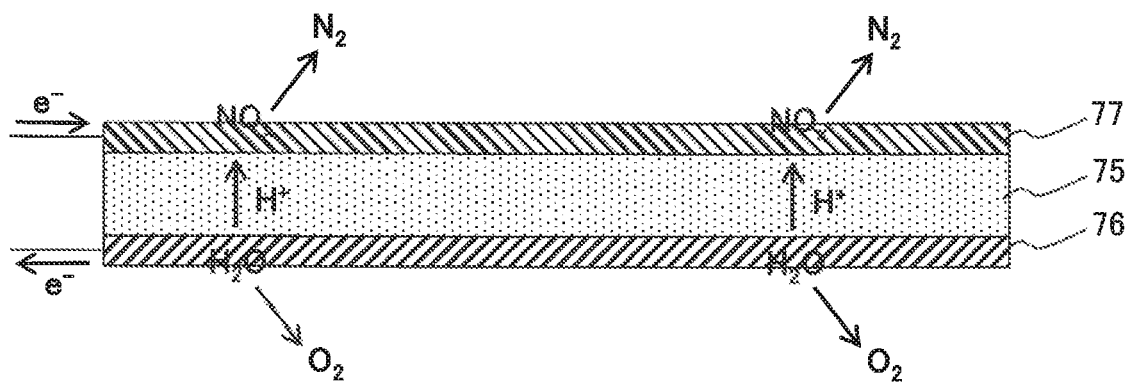
FIGS. 12A and 12B are views schematically showing a reaction occurring around a partition wall when current flows.
Figure 12B:
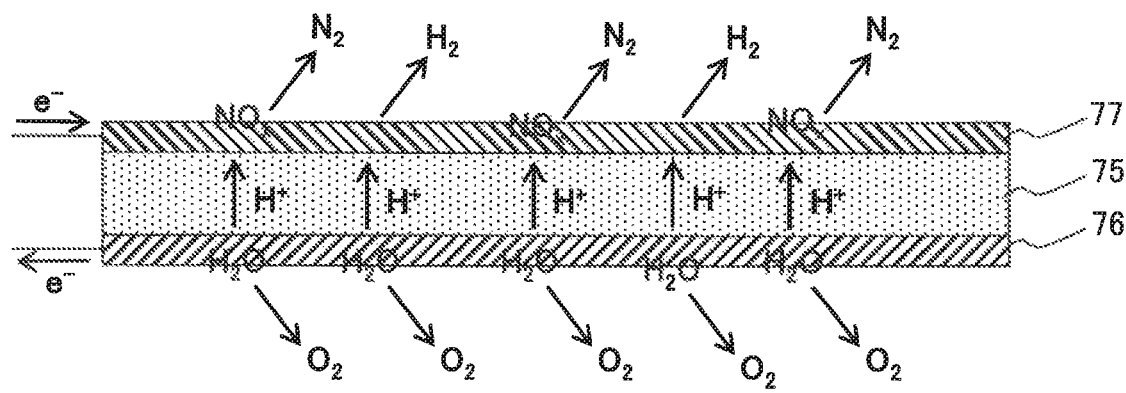

Next, referring to FIGS. 12A and 12B, the properties of the reactor 45 configured as explained above will be simply explained. FIG. 12A is a view schematically showing the reaction which occurs around a partition wall 71, when the current supplied to the reactor 45 is small. FIG. 12B is a view schematically showing the reaction which occurs around a partition wall 71, when the current supplied to the reactor is large.

As shown in FIG. 12A, when the supplied current is small, a small amount of protons moves from the anode layer 76 through the solid electrolyte layer 75 to the cathode layer 77. Therefore, almost all of the protons moving to the cathode layer 77 react with the NO held in the cathode layer 77 whereby $N_2$ is formed.

On the other hand, as shown in FIG. 12B, when the supplied current is large, a large amount of protons move from the anode layer 76 through the solid electrolyte layer 75 to the cathode layer 77. Therefore, the rate of removal of the NO at the cathode layer 77 is somewhat higher, compared with when the supplied current is small, but part of the protons moving to the cathode layer 77 does not react with the NO held at the cathode layer 77 and is released into the exhaust gas as hydrogen molecules. Therefore, if the supplied current is large, more than the necessary protons are generated from the water molecules held at the anode layer 76.

In the present embodiment, at the time t1 to the time t2 of FIG. 9, a current smaller than the current where all of the $NO_X$ held in the cathode layer 77 is purified from the exhaust gas, is supplied to the reactor 45. Therefore, as shown in FIG. 12B, it is possible to efficiently purify the $NO_X$ without excessive movement of protons.

On the other hand, at the time t1 to the time t2, the $NO_X$ held at the cathode layer 77 is not completely purified. Therefore, when the internal combustion engine 1 is stopped, $NO_X$ remains in the cathode layer 77, but by current being supplied to the reactor 45 while the internal combustion engine 1 is stopped, the $NO_X$ remaining in the cathode layer 77 can be purified. In particular, while the internal combustion engine 1 is stopped, the current supplied to the reactor 45 is smaller compared to when the internal combustion engine 1 is operating, and therefore as shown in FIG. 12B, the protons moving through the solid electrolyte layer 75 are kept from being released into the exhaust gas as hydrogen molecules.

Third Embodiment

Next, referring to FIG. 13, an internal combustion engine 1 according to a third embodiment will be explained. The configuration and control of the internal combustion engine 1 according to the third embodiment are basically similar to the configurations and controls of the internal combustion engines 1 according to the first and second embodiments. Below, the explanation will be given focused on the parts different from the internal combustion engines 1 according to the first and second embodiments.

Figure 13:
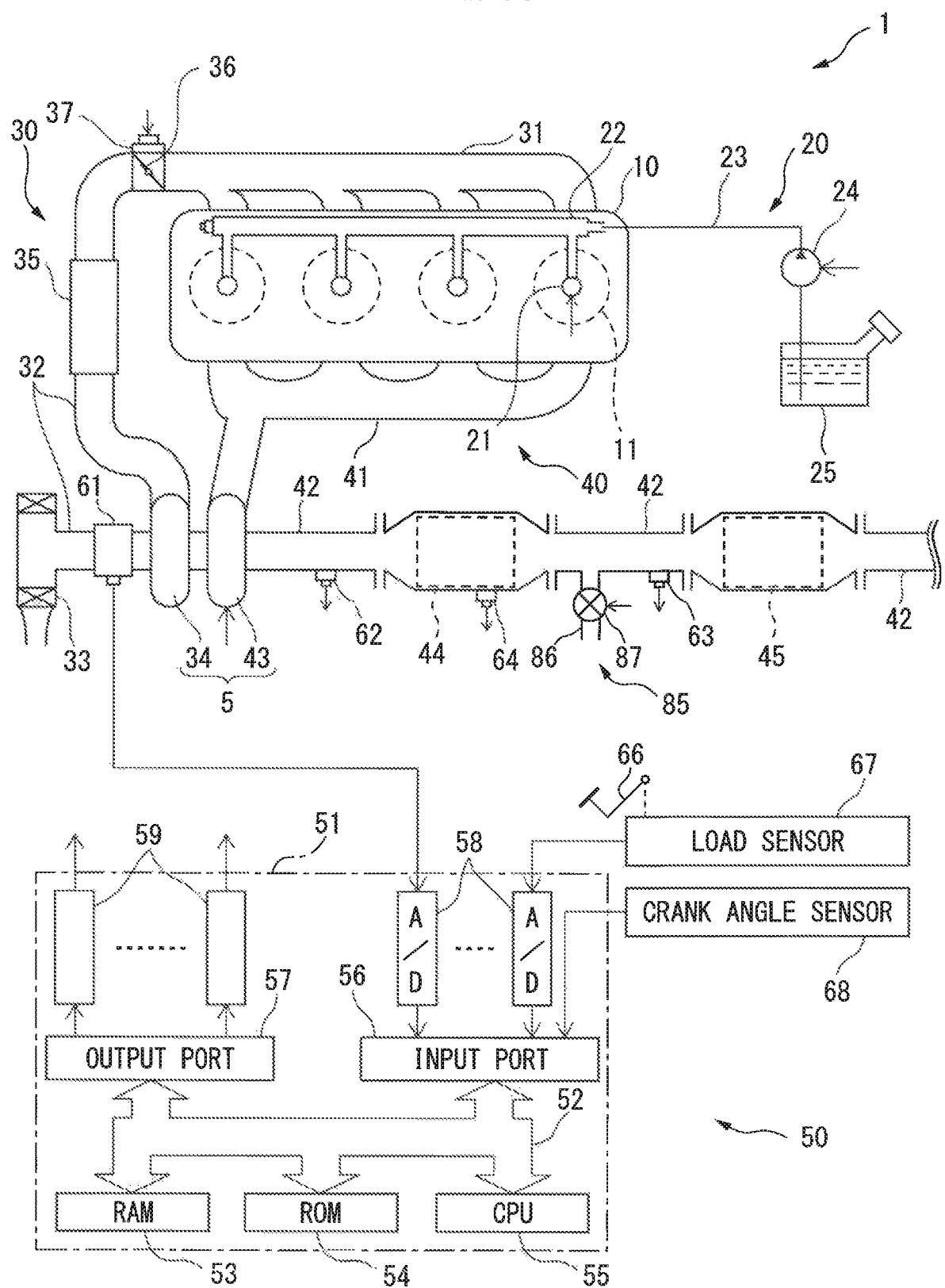
FIG. 13 is a schematic view of the configuration of an internal combustion engine.

As shown in FIG. 13, in the present embodiment, at the upstream side of the reactor 45 in the direction of exhaust flow, the exhaust system 40 is provided with an outside air introduction mechanism 85 introducing outside air into the exhaust passage. The outside air introduction mechanism 85 is provided with an outside air introduction pipe 86 communicating with exhaust pipe 42 at the downstream side of the exhaust purification catalyst 44 and at the upstream side of the reactor 45 in the direction of exhaust flow, and an on-off valve 87 provided at the outside air introduction pipe 86.

One end of the outside air introduction pipe 86 is communicated with the exhaust pipe 42 and the other end thereof is opened to the atmosphere. Further, the on-off valve 87 opens and closes the outside air introduction pipe 86. Therefore, when the on-off valve 87 is opened, outside air is introduced to the exhaust pipe 42 at the downstream side of the exhaust purification catalyst 44 and the upstream side of the reactor 45. On the other hand, when the on-off valve 87 is closed, outside air is not introduced to the exhaust pipe 42. Note that, the on-off valve 87 is connected through the corresponding drive circuit 59 to the output port 57 of the ECU 51. Therefore, the operation of the on-off valve 87 is controlled by the ECU 51.

In the internal combustion engine 1 configured in this way, the on-off valve 87 is opened at least temporarily while the internal combustion engine 1 is stopped and outside air is introduced into the exhaust pipe 42. Specifically, for example, the on-off valve 87 is constantly opened while the internal combustion engine 1 is stopped.

Further, when the on-off valve 87 is opened, outside air is introduced into the reactor 45. Therefore, the cathode layer 77 of the reactor 45 holds the $NO_X$ in the outside air. Therefore, in the present embodiment, the amount of $NO_X$ held at the cathode layer 77 due to the on-off valve 87 being opened is estimated, and when the estimated amount of $NO_X$ held becomes equal to or greater than a predetermined purification start amount, current is supplied to the reactor 45 to purify the held $NO_X$. Due to this, according to the present embodiment, the $NO_X$ in the atmosphere can be purified.

Note that, the amount of $NO_X$ held at the cathode layer 77 is, for example, estimated based on the opening time of the on-off valve 87, the speed of the vehicle mounting the internal combustion engine 1 while the on-off valve 87 is open, etc. As the opening time of the on-off valve 87 is longer or as the speed of the vehicle is faster, the amount of $NO_X$ held at the cathode layer 77 is calculated greater.

Further, the on-off valve 87 does not necessarily have to be constantly opened while the internal combustion engine 1 is stopped. For example, it may also be opened while the internal combustion engine 1 is stopped and the vehicle mounting the internal combustion engine 1 is moving. If the vehicle is moving, outside air is easily introduced from the outside air introduction pipe 86, and therefore it is possible to efficiently hold the $NO_X$ in the outside air, by opening the on-off valve 87 only while the vehicle is moving.

Fourth Embodiment

Next, referring to FIGS. 14 and 15, a vehicle 100 according to a fourth embodiment will be explained. The configuration and control of an internal combustion engine 1 used in the vehicle 100 according to the fourth embodiment are basically similar to the configurations and controls of the internal combustion engines 1 according to the first to third embodiments.

Configuration of Vehicle

Figure 14:
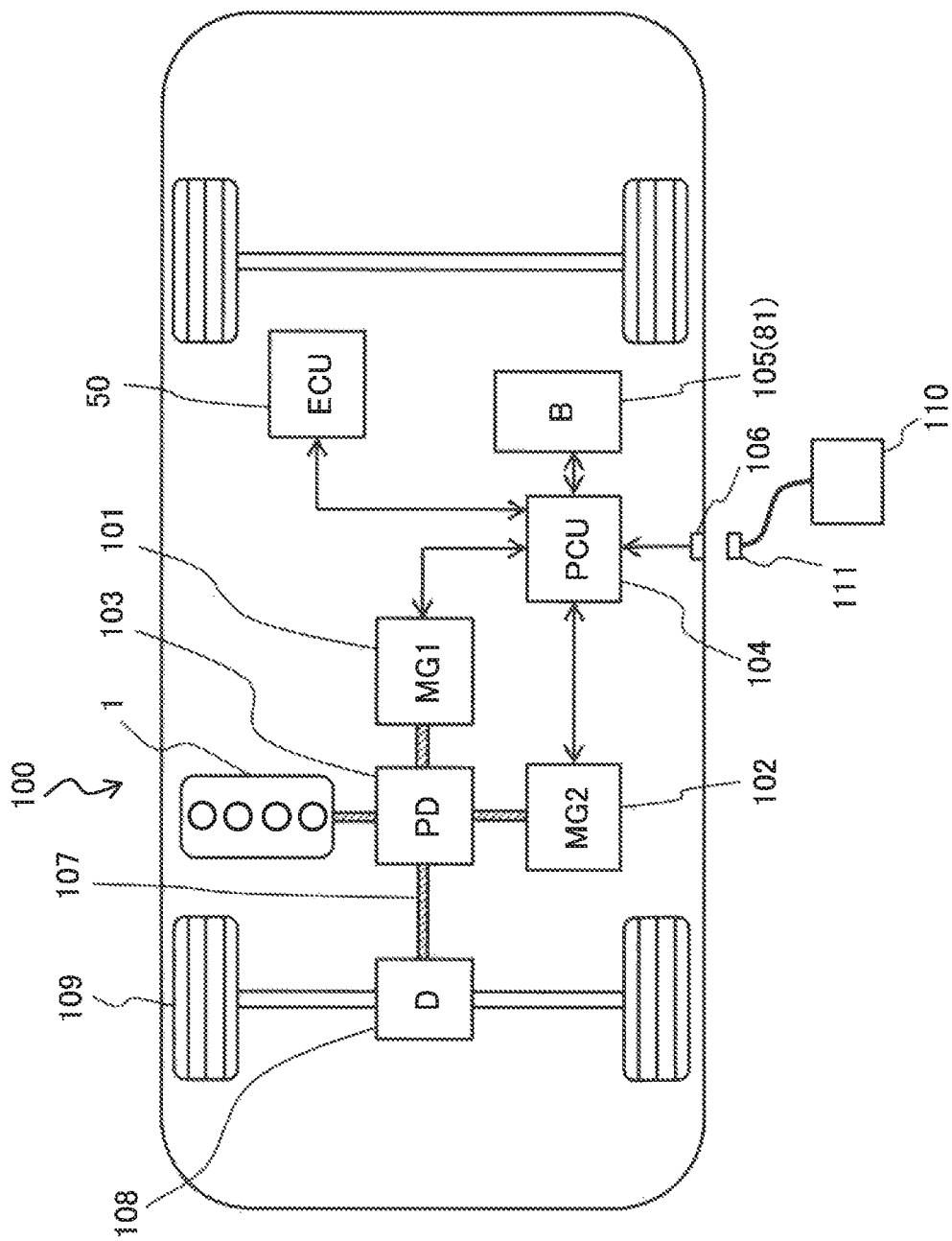
FIG. 14 is a view schematically showing a hybrid vehicle according to a fourth embodiment.

FIG. 14 is a view schematically showing a hybrid vehicle (below, simply referred to as the "vehicle") 100 according to the fourth embodiment. The vehicle 100 is provided with the internal combustion engine 1, a first motor-generator 101, a second motor-generator 102, and a power dividing mechanism 103. In addition, the vehicle 100 is provided with a power control unit (PCU) 104 electrically connected to the first motor-generator 101 and the second motor-generator 102, a battery 105 electrically connected to the PCU 104, and a vehicle side connector 106.

The output shaft (crankshaft) of the internal combustion engine 1 is mechanically coupled with the power dividing mechanism 103. The power generated by the internal combustion engine 1 is input to the power dividing mechanism 103.

The first motor-generator 101 is mechanically connected to the power dividing mechanism 103 at its input/output shaft, and is electrically connected to the PCU 104. If electric power is supplied from the PCU 104, the first motor-generator 101 is driven by that electric power and power is output to the power dividing mechanism 103. Therefore, at this time, the first motor-generator 101 functions as a motor.

On the other hand, if power is input from the power dividing mechanism 103 to the first motor-generator 101, the first motor-generator 101 is driven by that power and generates electric power. The generated electric power is supplied through the PCU 104 to the battery 105 and thus the battery 105 is charged. Therefore, at this time, the first motor-generator 101 functions as a generator. Note that, the first motor-generator 101 may be a generator not functioning as a motor.

The second motor-generator 102 is mechanically connected to the power dividing mechanism 103 at its input/output shaft, and is electrically connected to the PCU 104. If electric power is supplied from the PCU 104, the second motor-generator 102 is driven by that electric power and power is output to the power dividing mechanism 103. Therefore, at this time, the second motor-generator 102 functions as a motor.

On the other hand, if the power from the power dividing mechanism 103 is input to the second motor-generator 102, the second motor-generator 102 is driven by that power and generates electric power. The generated electric power is supplied through the PCU 104 to the battery 105 whereby the battery 105 is charged. Therefore, at this time, the second motor-generator 102 functions as a generator. Note that, the second motor-generator 102 may also be a motor not functioning as a generator.

The power dividing mechanism 103 is mechanically coupled with the internal combustion engine 1, the first motor-generator 101, and the second motor-generator 102. In addition, the power dividing mechanism 103 is coupled with a drive shaft 107, while the drive shaft 107 is coupled through a differential gear 108 to the vehicle wheels 109.

The PCU 104 is provided with an inverter, DC-DC converter, etc. and is electrically connected to the first motor-generator 101, the second motor-generator 102, and the battery 105. The PCU 104 controls the first motor-generator 101, the second motor-generator 102, and the battery 105 and converts the electric power supplied from the battery 105 to these motor-generators 101, 102 or converts the electric power supplied from the motor-generators 101, 102 to the battery 105. In addition, the PCU 104 is connected to the ECU 50 and is controlled by the ECU 50.

The battery 105 is electrically connected to the PCU 104 and stores electrical power. If the first motor-generator 101 or the second motor-generator 102 is driven by power input from the power dividing mechanism 103, the battery 105 is charged through the PCU 104. On the other hand, when the first motor-generator 101 or the second motor-generator 102 outputs power to the power dividing mechanism 103, the battery 105 supplies electric power through the PCU 104 to the first motor-generator 101 or the second motor-generator 102.

Further, in the present embodiment, the battery 105 functions as a power system 81 supplying current to the reactor 45. Therefore, the battery 105 supplies current to the reactor 45.

The vehicle side connector 106 is a connector for connection with the outside power source 110. The vehicle side connector 106 is electrically connected to the PCU 104. Further, the vehicle side connector 106 is configured to be able to connect with an outside connector 111 electrically connected to the outside power source 110. If the vehicle side connector 106 is connected to the outside connector 111, the battery 105 is charged from the outside power source 110 through these vehicle side connector 106 and outside connector 111 and PCU 104. Therefore, the vehicle 100 is configured to be able to charge the battery 105 by the outside power source 110.

In the thus configured vehicle 100, if inputting part or all of the power obtained by the internal combustion engine 1 to the first motor-generator 101 or the second motor-generator 102, it is possible to generate electrical power by the first motor-generator 101 or the second motor-generator 102. The electric power obtained by this power generation is charged through the PCU 104 to the battery 105 or is supplied to the motor-generator not generating electrical power, among the first motor-generator 101 and the second motor-generator 102. Therefore, the vehicle 100 is configured so as to enable electric power generated by the output of the internal combustion engine 1 to be charged to the battery 105. Further, if inputting part or all of the power obtained by the internal combustion engine 1 to the drive shaft 107, that power can be used to make the vehicle wheels 109 rotate.

Further, the vehicle 100 is configured to be able to use the electric power supplied from the battery 105 to drive the first motor-generator 101 or the second motor-generator 102. The power obtained by driving the first motor-generator 101 or the second motor-generator 102 can be input to the internal combustion engine 1. Therefore, it is possible to use this power to make the stopped internal combustion engine 1 start. Further, if inputting the power obtained by the first motor-generator 101 or the second motor-generator 102 to the drive shaft 107, it is possible to use this power to make the vehicle wheels 109 rotate.

Control of Electrochemical Reactor

In this regard, in the case where, like in the present embodiment, the reactor 45 is connected to the battery 105, if electrical current is supplied to the reactor 45 while the internal combustion engine 1 is stopped, the state of charge of the battery 105 decreases. The battery 105 is also used for supplying electric power to the motor-generators 101, 102, and therefore if the state of charge of the battery 105 falls too much, the distance of possible driving by the motor-generators 101, 102 becomes shorter. Therefore, in the present embodiment, even while the internal combustion engine 1 is stopped, if the state of charge (SOC) of the battery 105 is equal to or less than a predetermined reference value, current is not supplied to the reactor 45.

Figure 15:
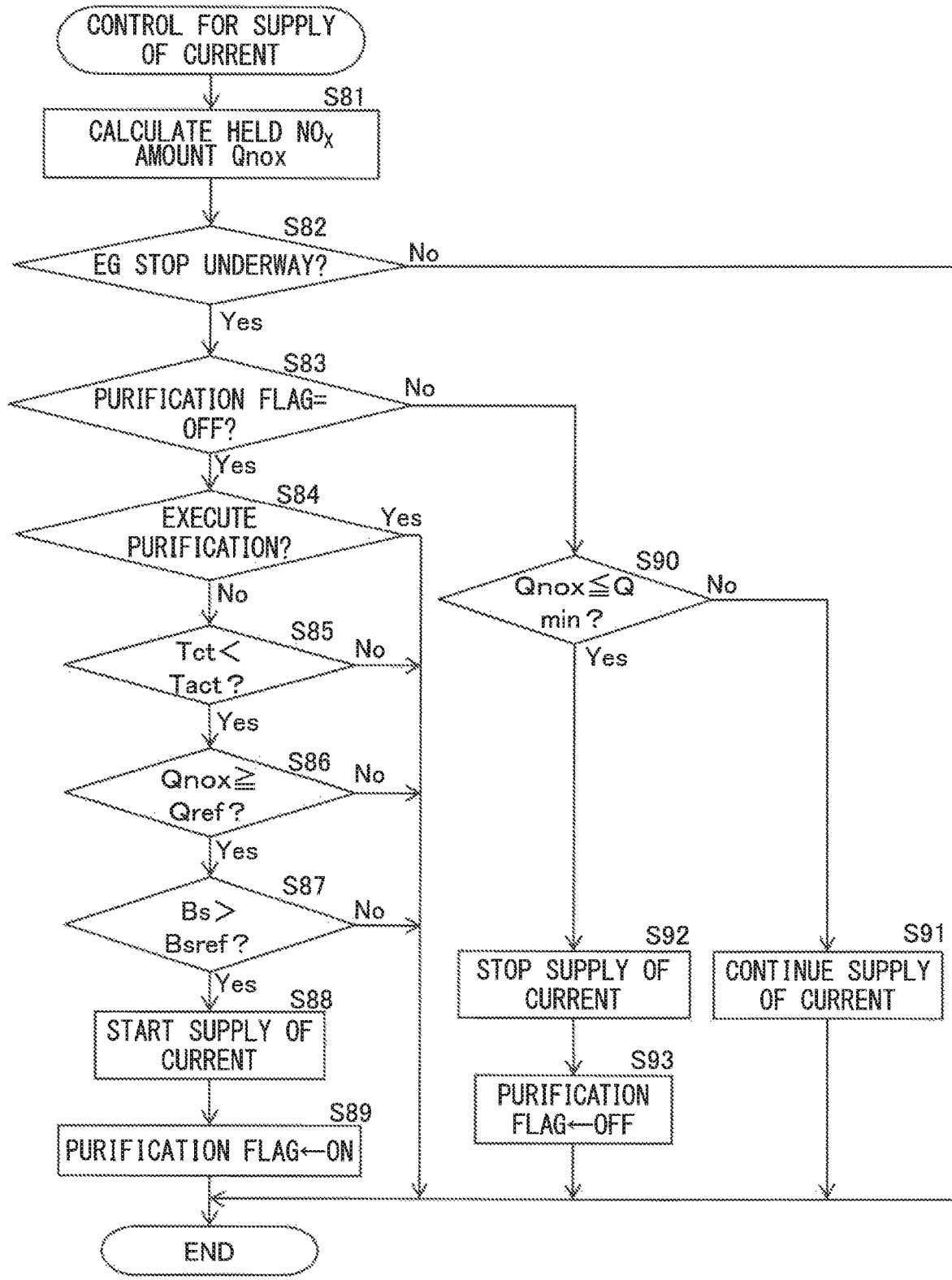
FIG. 15 is a flow chart showing a control routine of control for supply of current to a reactor in the vehicle according to the fourth embodiment.

FIG. 15 is a flow chart showing a control routine of control for supply of current to the reactor 45 in the vehicle 100 according to the fourth embodiment. The illustrated control routine is performed every certain time interval. Steps S81 to S86 of FIG. 15 are respectively similar to steps S31 to S36 of FIG. 8, while steps S88 to S93 of FIG. 15 are respectively similar to steps S37 to S42 of FIG. 8, and therefore explanations of these steps will be omitted.

As shown in FIG. 15, if at step S86 it is judged that the held $NO_X$ amount Qnox is equal to or greater than a predetermined reference amount Qref, the routine proceeds to step S87. At step S87, it is judged if the state of charge Bs of the battery 105 is higher than a predetermined reference value Bsref. The reference value Bsref, for example, is set to 50% or so. If at step S87 it is judged that the state of charge Bs of the battery is equal to or less than the reference value, the control routine is ended. On the other hand, if at step S87 it is judged that the state of charge of the battery 105 is higher than the reference value, the routine proceeds to step S88.

According to the present embodiment, when the state of charge of the battery 105 is low, electrical current is not being supplied to the reactor 45, and therefore the state of charge of the battery 105 is kept from excessively falling while the internal combustion engine 1 is stopped.

Modification

Next, referring to FIGS. 16 and 17, a first modification of the fourth embodiment will be explained. In the present modification, while the internal combustion engine 1 is stopped, electrical current is supplied to the reactor 45 when the battery 105 connected to the outside power source 110 is charged by the vehicle side connector 106 through an outside connector 111.

Figure 16:
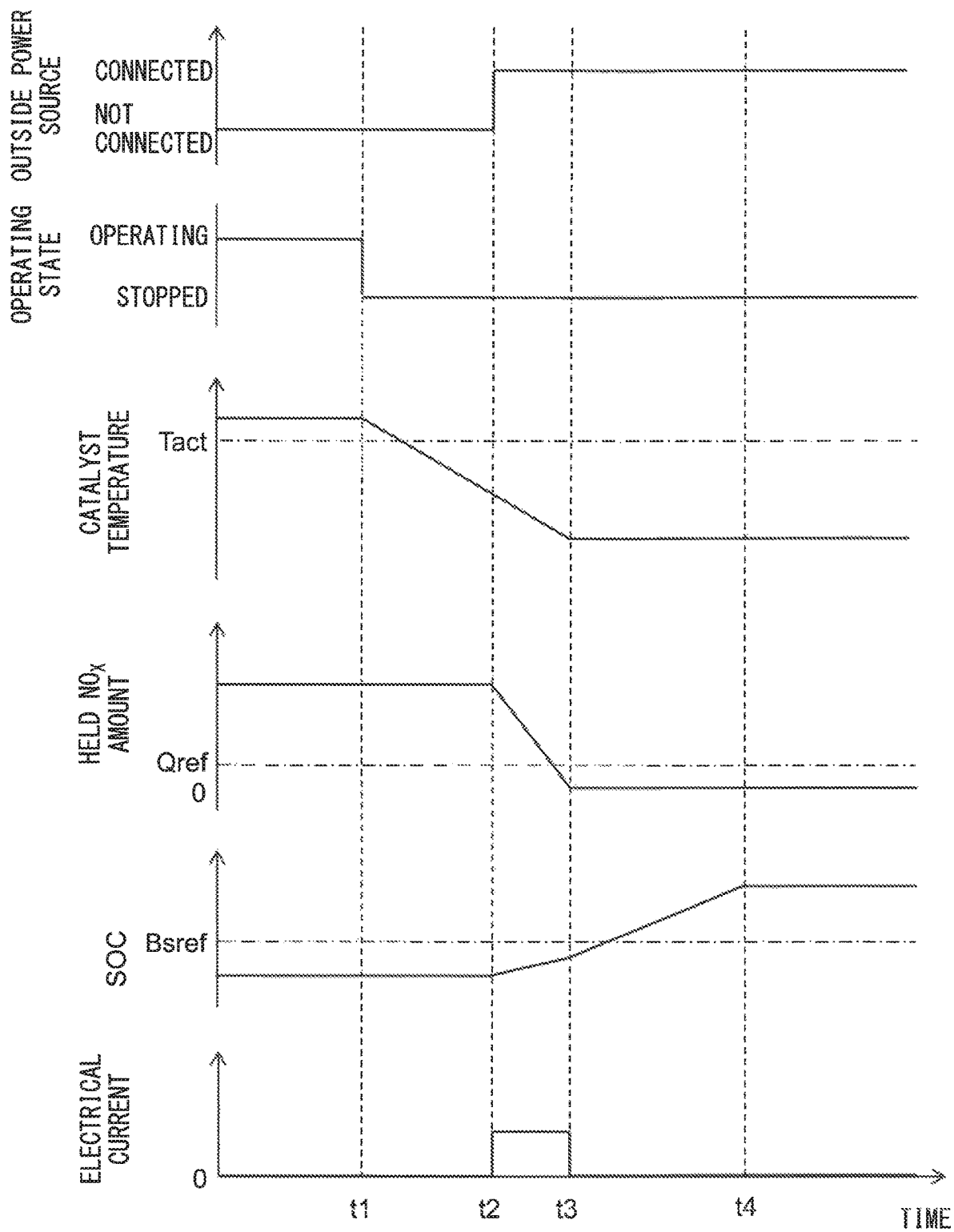
FIG. 16 is a time chart of a state of connection of an outside power source, etc.

FIG. 16 is a time chart of a connection state of the outside power source 110, the operating state of the internal combustion engine 1, the temperature of the exhaust purification catalyst 44, the amount of $NO_X$ held at the cathode layer 77, the state of charge (SOC) of the battery 105, and the electrical current supplied to the reactor 45.

In the example shown in FIG. 16, at the time t1, the internal combustion engine 1 is stopped and thereby after the time t1, the temperature of the exhaust purification catalyst 44 falls. However, after the time t1, the state of charge Bs of the battery 105 is less than the reference value Bsref, and therefore current is not supplied to the reactor 45.

Then, if, at the time t2, the vehicle side connector 106 is connected to the outside power source 110, in the present embodiment, even if the state of charge of the battery 105 is equal to or less than the reference value Bsref, current is supplied to the reactor 45. At this time, the current supplied to the reactor 45 is small, and therefore even if current is being supplied to the reactor 45, the state of charge Bs of the battery 105 gradually rises.

Then, in the illustrated example, if at the time t3, the amount of $NO_X$ held at the cathode layer 77 becomes substantially zero, and therefore the supply of current to the reactor 45 is stopped. As a result, after the time t3, the speed of rise of the state of charge Bs of the battery 105 becomes faster and at the time t4 the battery 105 finishes being charged.

Note that, in the above first modification, regardless of the state of charge of the battery 105, when connected to the outside power source 110, current is supplied to the reactor 45. However, when the state of charge of the battery 105 is low, in order to give priority to charging of the battery 105, it is also possible not to supply current to the reactor 45 even if connected to the outside power source 110 when the state of charge of the battery 105 is equal to or less than a certain reference value (which may be a value the same as or different from the reference value Bsref).

Figure 17:
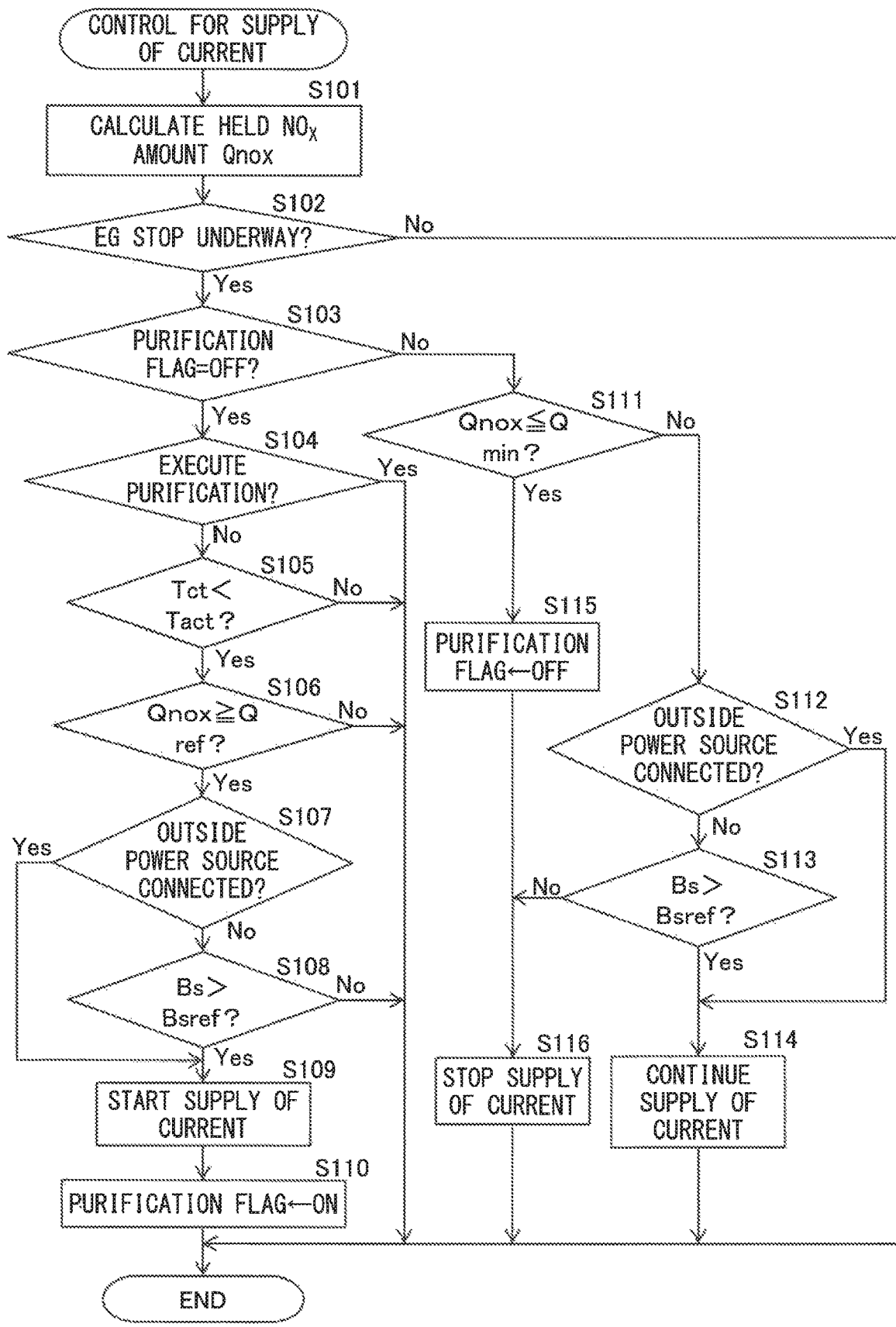
FIG. 17 is a flow chart showing a control routine of control for supply of current to a reactor in a vehicle according to a first modification of the fourth embodiment.

FIG. 17 is a flow chart showing a control routine of control for supply of current to the reactor 45 in the vehicle 100 according to a first modification of the fourth embodiment. The illustrated control routine is performed every certain time interval. Steps S101 to S106 of FIG. 17 are respectively similar to steps S81 to S86 of FIG. 15, while steps S108 to S111 of FIG. 17 are respectively similar to steps S87 to S90 of FIG. 15, and therefore explanations of these steps will be omitted.

If it is judged at step S106 that the held $NO_X$ amount Qnox is equal to or greater than a predetermined reference amount Qref, the routine proceeds to step S107. At step S107, it is judged if the battery 105 is connected to an outside power source 110. If it is judged that it is connected to an outside power source 110, the routine proceeds to step S109, while if it is judged that it is not connected to the outside power source 110, the routine proceeds to step S108.

Further, if at step S111 it is judged that the held $NO_X$ amount Qnox is greater than the minimum amount Qmin, the routine proceeds to step S112. At step S112, it is judged if the battery 105 is connected to an outside power source 110. If it is judged that it is connected to an outside power source 110, the routine proceeds to step S114, while if it is judged that it is not connected to the outside power source 110, the routine proceeds to step S113.

At step S113, it is judged if the state of charge Bs of the battery 105 is higher than a predetermined reference value Bsref. If it is judged that the state of charge Bs of the battery 105 is higher than the reference value Bsref, the routine proceeds to step S114 where the supply of power to the reactor 45 is continued. On the other hand, if at step S113 it is judged that the state of charge Bs of the battery 105 is equal to or less than the reference value Bsref, the routine proceeds to step S116 and the supply of power to the reactor 45 is stopped.

On the other hand, if at step S111 it is judged that the held $NO_X$ amount Qnox is equal to or less than the minimum amount Qmin, the routine proceeds to step S115. At step S115, the purification flag is set to OFF, then the routine proceeds to step S116 and supply of power to the reactor 45 is stopped.

Next, referring to FIGS. 18 and 19, a second modification of the fourth embodiment will be explained. In this regard, as explained above, the vehicle 100 is provided with the motor-generators 101, 102, and therefore at the time of deceleration of the vehicle 100, these motor-generators 101, 102 can be used to recover kinetic energy of the vehicle and charge the battery 105. Therefore, in the second modification, while the internal combustion engine 1 is stopped, current is supplied to the reactor 45 when power is generated by the motor-generators 101, 102 along with deceleration of the vehicle 100.

Figure 18:
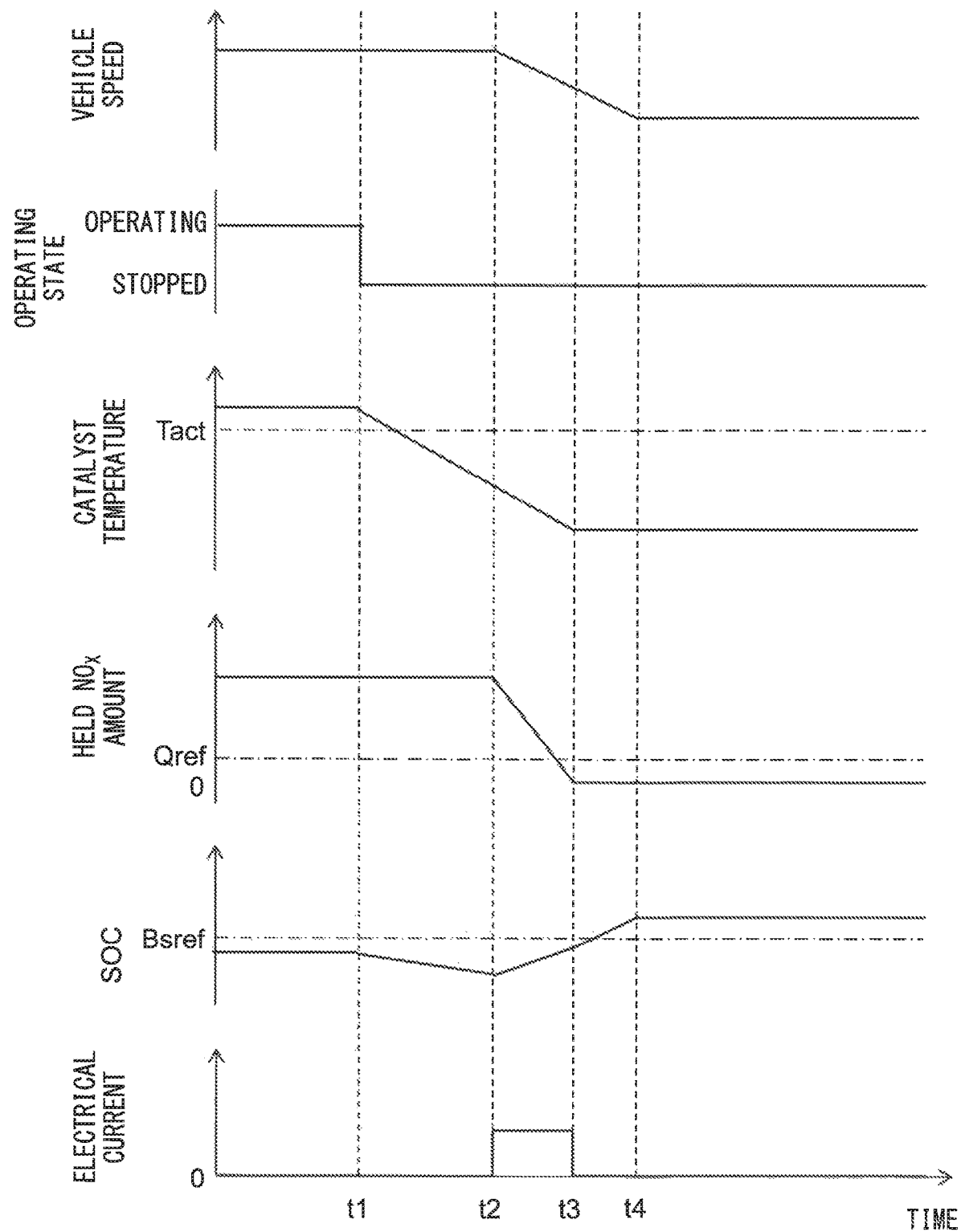
FIG. 18 is a time chart of a speed of a vehicle etc.

FIG. 18 is a time chart of the speed of the vehicle 100, the operating state of the internal combustion engine 1, the temperature of the exhaust purification catalyst 44, the amount of $NO_X$ held at the cathode layer 77, the state of charge (SOC) of the battery 105, and the current supplied to the reactor 45.

In the example shown in FIG. 18, at the time t1, the internal combustion engine 1 is stopped. Accordingly, after the time t1, the temperature of the exhaust purification catalyst 44 falls. However, after the time t1, the state of charge Bs of the battery 105 is less than the reference value Bsref, and therefore current is not supplied to the reactor 45.

Then, at the time t2, if the vehicle 100 starts to decelerate, power is generated by the motor-generators 101, 102 and electric power is supplied from the motor-generators 101, 102 to the battery 105. If power is generated by the motor-generators 101, 102 in this way, in the present embodiment, even if the state of charge of the battery 105 is equal to or less than the reference value Bsref, current is supplied to the reactor 45. At this time, the current supplied to the reactor 45 is small, and therefore even if current is being supplied to the reactor 45, the battery 105 is charged and the state of charge Bs of the battery 105 gradually rises.

Then, in the illustrated example, at the time t3, the amount of $NO_X$ held at the cathode layer 77 becomes substantially zero, and therefore the supply of current to the reactor 45 is stopped. As a result, after the time t3, the speed of rise of the state of charge Bs of the battery 105 becomes faster. Then, at the time t4, if the vehicle 100 finishes decelerating, the charging of the battery 105 is also stopped.

Note that, in the above second modification, regardless of the state of charge of the battery 105, when power is being generated by the motor-generators 101, 102, current is supplied to the reactor 45. However, when the state of charge of the battery 105 is low, in order to give priority to charging the battery 105, current may not be supplied to the reactor 45 even if connected to an outside power source 110, when the state of charge of the battery 105 is equal to or less than a certain reference value (which may be value same as or different from the above reference value Bsref).

Figure 19:
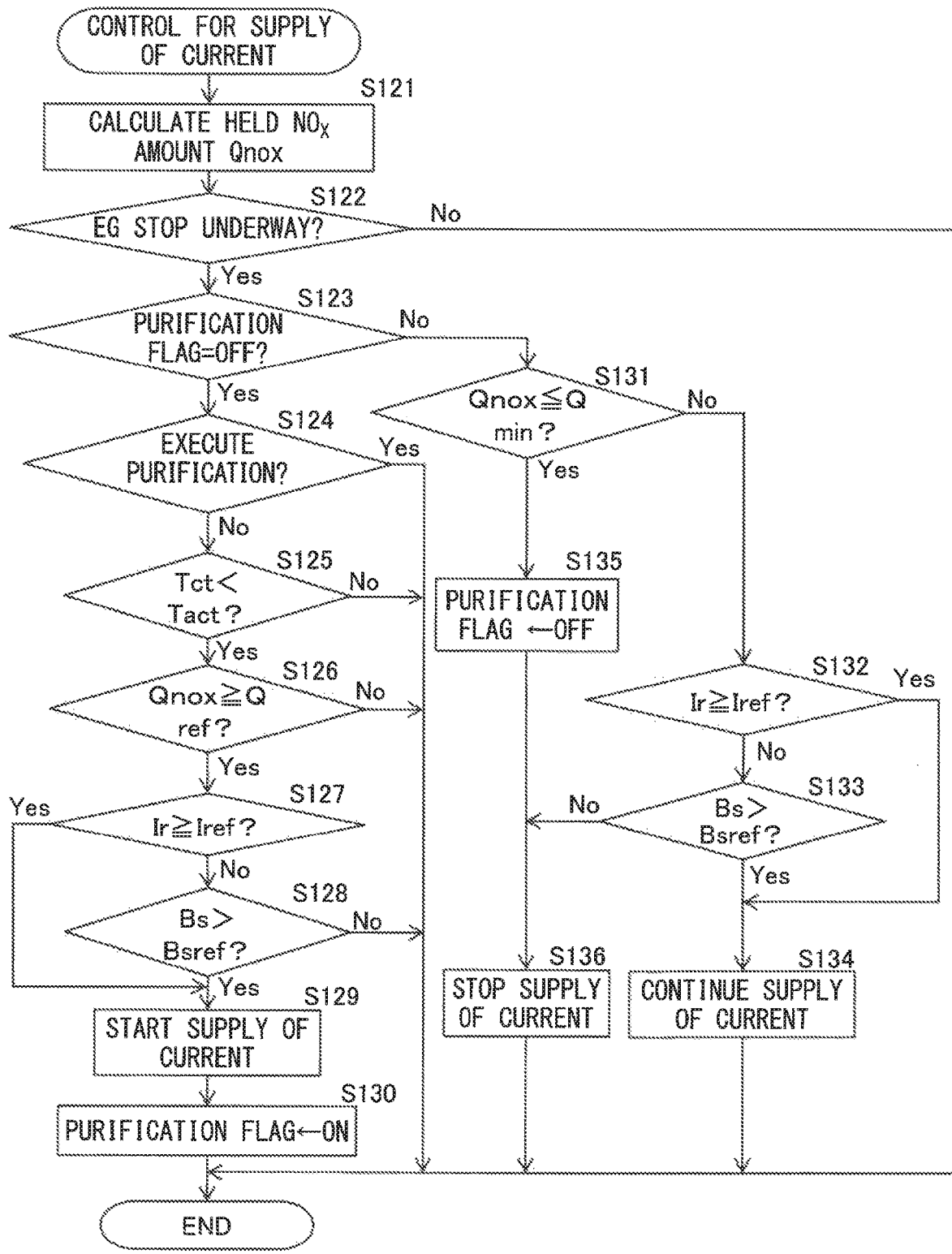
FIG. 19 is a flow chart showing a control routine of control for supply of current to a reactor in a vehicle according to a second modification of the fourth embodiment.

FIG. 19 is a flow chart showing a control routine of control for supplying current to the reactor 45 in the vehicle 100 according to a second modification of the fourth embodiment. The illustrated control routine is executed every certain time interval. Steps S127 and S132 of FIG. 19 respectively differ from steps S107 and S112 of FIG. 17. Other than that, the flow chart of FIG. 19 is similar to the flow chart of FIG. 17. Therefore, below, only steps S127 and S132 will be explained.

If at step S126 it is judged that the held $NO_X$ amount Qnox is equal to or greater than a predetermined reference amount Qref, the routine proceeds to step S127. At step S127, it is judged if the current Ir produced by generation of the motor-generators 101, 102 (generated current) is equal to or greater than a predetermined reference value Iref. If it is judged that the generated current Ir is equal to or greater than the reference value Iref, the routine proceeds to step S129, while if it is judged that the generated current Ir is less than the reference value Iref, the routine proceeds to step S128. At step S132 as well, judgment similar to step S126 is performed. Note that, the reference value Iref at steps S127 and S132, for example, is a value of the same extent as or smaller than the current supplied to the reactor 45.

The invention claimed is:

1. An internal combustion engine, inside of an exhaust passage of which is placed an electrochemical reactor comprising: an ion conductive solid electrolyte layer; an anode layer arranged on a surface of the solid electrolyte layer; and a cathode layer arranged on a surface of the solid electrolyte layer and able to hold $NO_X$, wherein
the engine comprises a current control device controlling the current supplied to the electrochemical reactor so as to flow from the anode layer through the solid electrolyte layer to the cathode layer, and
the current control device is configured so as to supply current to the electrochemical reactor at least temporarily while that internal combustion engine is stopped.

2. The internal combustion engine according to claim 1, wherein the current control device is configured to supply current to the electrochemical reactor at least temporarily while that internal combustion engine is operating.

3. The internal combustion engine according to claim 2, wherein
the solid electrolyte layer of the electrochemical reactor have proton conductivity, and
the current control device is configured to control the current supplied to the electrochemical reactor so that the current supplied to the electrochemical reactor while the internal combustion engine is stopped is smaller than the current supplied to the electrochemical reactor while the internal combustion engine is operating.

4. The internal combustion engine according to claim 1, wherein
the engine further comprises an exhaust purification catalyst provided in the exhaust passage,
the exhaust purification catalyst is configured to purify $NO_X$ in exhaust gas when its temperature is equal to or greater than an activation temperature, and
the current control device is configured to not supply current to the electrochemical reactor while the internal combustion engine is stopped, when the temperature of the exhaust purification catalyst is equal to or greater than the activation temperature.

5. The internal combustion engine according to claim 1, wherein
the engine further comprises an outside air introduction mechanism introducing outside air into the exhaust passage at the upstream side of the electrochemical reactor in the direction of exhaust flow, and
the outside air introduction mechanism is configured to introduce outside air into the exhaust passage at least temporarily while the internal combustion engine is stopped.

6. The internal combustion engine according to claim 1, wherein the current control device:
is configured to estimate the amount of $NO_X$ held at the cathode layer of the electrochemical reactor; and
is configured to not start the supply of current to the electrochemical reactor while the internal combustion engine is stopped, when the estimated amount of $NO_X$ is less than a predetermined reference amount.

7. A vehicle mounting the internal combustion engine according to claim 1 and a motor, wherein
the vehicle comprises a battery supplying electric power to the motor and connected to the electrochemical reactor, and
current to the electrochemical reactor is supplied from the battery.

8. The vehicle according to claim 7, wherein the current control device is configured to not supply current to the electrochemical reactor when the state of charge of the battery is equal to or less than a predetermined reference value.

9. The vehicle according to claim 7, wherein
the vehicle further comprises a vehicle side connector connected to the battery,
the vehicle side connector is configured to be able to charge the battery by being connected to an outside power source, and
the current control device is configured so as to supply current to the electrochemical reactor while the internal combustion engine is stopped, when the vehicle side connector is connected to the outside power source and the battery is being charged.

10. The vehicle according to claim 7 wherein
the vehicle further comprises a generator able to generate power while the vehicle is decelerating and connected to the battery, and
the current control device is configured so as to supply current to the electrochemical reactor when power is being generated by the generator along with deceleration of the vehicle while the internal combustion engine is stopped.

\* \* \* \* \*